(12) United States Patent
Zhang et al.

(10) Patent No.: US 12,484,031 B2
(45) Date of Patent: Nov. 25, 2025

(54) RESOURCE DETERMINING METHOD AND APPARATUS FOR UPLINK TRANSMISSION

(71) Applicant: Huawei Technologies Co., Ltd., Shenzhen (CN)

(72) Inventors: Jian Zhang, Shenzhen (CN); Lixia Xue, Beijing (CN); Yifan Xue, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 405 days.

(21) Appl. No.: 18/009,624

(22) PCT Filed: Mar. 17, 2021

(86) PCT No.: PCT/CN2021/081243
§ 371 (c)(1),
(2) Date: Dec. 9, 2022

(87) PCT Pub. No.: WO2021/248960
PCT Pub. Date: Dec. 16, 2021

(65) Prior Publication Data
US 2023/0217420 A1    Jul. 6, 2023

(30) Foreign Application Priority Data

Jun. 10, 2020   (CN) .......................... 202010525719.2
Jul. 15, 2020   (CN) .......................... 202010689436.1

(51) Int. Cl.
*H04W 72/0446*   (2023.01)
*H04L 5/14*   (2006.01)

(52) U.S. Cl.
CPC ....... *H04W 72/0446* (2013.01); *H04L 5/1469* (2013.01)

(58) Field of Classification Search
CPC ... H04L 5/0023; H04L 5/0053; H04L 5/1469; H04W 72/0446; H04W 72/23
See application file for complete search history.

(56) References Cited

U.S. PATENT DOCUMENTS

2019/0222361 A1*   7/2019   Cheng ................. H04L 25/0226
2019/0327069 A1*  10/2019   Novlan ................. H04L 5/0039
(Continued)

FOREIGN PATENT DOCUMENTS

CN          111200853 A        5/2020
WO        2019083317 A1        5/2019

OTHER PUBLICATIONS

"Discussion on Supplementary Uplink Frequency"; 3GPP TSG-RAN WG1 Meeting #90 R1-1714482 Prague, Germany, Aug. 21-25, 2017; China Telecom (Year: 2017).*

(Continued)

*Primary Examiner* — Benjamin H Elliott, IV
(74) *Attorney, Agent, or Firm* — Conley Rose, P.C.

(57) ABSTRACT

A method includes: when a band, in which a supplemental uplink (SUL) carrier is located, multiplexes a time-division duplex (TDD) band or a low-frequency frequency-division duplex (FDD) band, M time domain resources used by a terminal device to perform SUL transmission is determined from N time domain resources included in the SUL carrier, and indication information that indicates the M time domain resources is sent to the terminal device such that the terminal device can send an uplink signal and/or an uplink channel using the M time domain resources. Further, a network device may configure an available time domain resource used for uplink transmission for the SUL carrier using a system information block (SIB), Radio Resource Control (RRC) dedicated signaling, or download control information (DCI)/media access control (MAC) control element (CE).

20 Claims, 9 Drawing Sheets

(56) References Cited

U.S. PATENT DOCUMENTS

| | | | | |
|---|---|---|---|---|
| 2019/0380087 | A1* | 12/2019 | Park | H04W 72/29 |
| 2020/0169990 | A1* | 5/2020 | Takeda | H04J 1/00 |
| 2020/0280899 | A1* | 9/2020 | Zhang | H04W 48/10 |
| 2020/0367289 | A1* | 11/2020 | Choi | H04L 5/0053 |
| 2021/0058974 | A1* | 2/2021 | Park | H04W 76/27 |
| 2021/0136646 | A1* | 5/2021 | Tseng | H04W 36/0088 |
| 2021/0176752 | A1* | 6/2021 | Yang | H04W 72/0453 |
| 2021/0274483 | A1* | 9/2021 | Zhang | H04L 5/1469 |
| 2022/0272659 | A1* | 8/2022 | Agiwal | H04W 76/28 |
| 2023/0217420 | A1* | 7/2023 | Zhang | H04L 5/0023 370/280 |
| 2023/0344566 | A1* | 10/2023 | Wang | H04B 17/347 |

OTHER PUBLICATIONS

"Consideration on SUL band on TDD frequency"; 3GPP TSG-RAN WG4 Meeting #85 R4-1712917 Reno, USA, Nov. 27-Dec. 1, 2017; CMCC (Year: 2017).*

"Consideration on TDM and FDM based ULSUP with SUL bands"; 3GPP TSG-RAN WG4 Meeting #86bis R4-1803692 Melbourne, Australia, Apr. 16-20, 2018; MediaTek Inc. (Year: 2017).*

"System Parameters for new SUL Band and discussion related to regulatory emission limits related to UE"; 3GPP TSG-RAN4 Meeting #96-e R4-2010746 E-meeting, Aug. 17-28, 2020; Ligado Networks (Year: 2020).*

* cited by examiner

Time domain resource for uplink transmission (U)

Flexible time domain resource (F)

Disabled time domain resource (D)

|    | 1 | 2 | 3 | 4 | 5 | 6 | 7 | 8 | 9 | 10 | 11 | 12 | 13 | 14 |
|----|---|---|---|---|---|---|---|---|---|----|----|----|----|----|
| 10 | F | U | U | U | U | U | U | U | U | U  | U  | U  | U  | U  |
| 11 | F | F | U | U | U | U | U | U | U | U  | U  | U  | U  | U  |
| ... |
(a)
|   | 1 | 2 | 3 | 4 | 5 | 6 | 7 | 8 | 9 | 10 | 11 | 12 | 13 | 14 |
|---|---|---|---|---|---|---|---|---|---|----|----|----|----|----|
| 1 | D | D | U | U | U | U | U | U | U | U  | U  | U  | U  | U  |
| 2 | D | D | F | F | U | U | U | U | U | U  | U  | U  | U  | U  |
| ... |
(b)
FIG. 8
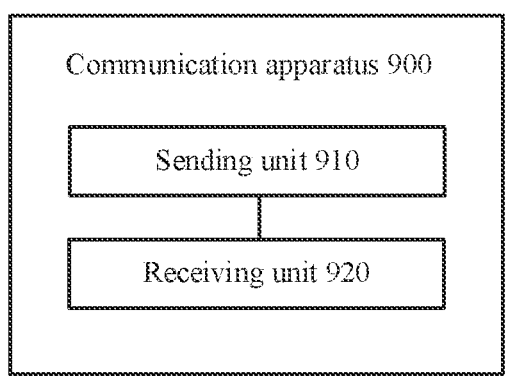
FIG. 9
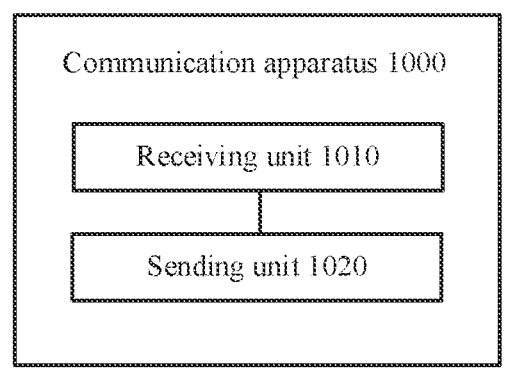
FIG. 10

RESOURCE DETERMINING METHOD AND APPARATUS FOR UPLINK TRANSMISSION

CROSS-REFERENCE TO RELATED APPLICATIONS

This is a U.S. National Stage of International Patent Application No. PCT/CN2021/081243 filed on Mar. 17, 2021, which claims priority to Chinese Patent Application No. 202010525719.2 filed on Jun. 10, 2020 and Chinese Patent Application No. 202010689436.1 filed on Jul. 15, 2020, all of which are hereby incorporated by reference in their entireties.

TECHNICAL FIELD

This application relates to the communication field, and more specifically, to a resource determining method and an apparatus in the communication field.

BACKGROUND

A conventional cell includes one downlink carrier and one uplink carrier. A base station sends a downlink signal to a terminal by using the downlink carrier, and the terminal sends an uplink signal to the base station by using the uplink carrier. When the cell is a time division duplex (time division duplex, TDD) cell, the uplink carrier and the downlink carrier are at a same frequency. When the cell is a frequency division duplex (frequency division duplex, FDD) cell, the uplink carrier and the downlink carrier are at two separate frequencies, and there is a frequency spacing between the two frequencies. TDD is time division duplex. To be specific, uplink and downlink multiplexing is performed in a same frequency band based on different time domain resources. FDD is frequency division duplex. To be specific, uplink and downlink multiplexing is performed in different frequency bands.

A frequency band used at an initial stage of deployment of the fifth generation (the fifth generation, 5G) mobile communication system is higher than a frequency band of the 4th generation (4th generation, 4G) mobile communication system. For example, a 3.5 Gigahertz (Giga Hertz, GHz) band is used in 5G deployment. An electromagnetic wave with a higher frequency is featured by greater attenuation, and a transmit power of a terminal is lower than that of a base station. Therefore, a terminal at a cell edge can receive a downlink signal from the base station, but the base station cannot receive an uplink signal from the terminal. As a result, an uplink coverage area is smaller than a downlink coverage area.

To improve uplink coverage of a 5G cell, one or more additional uplink carriers at lower frequencies may be used in addition to an original uplink carrier of the cell, to send an uplink signal. The uplink carrier with a lower frequency may be referred to as a "supplementary uplink (supplemental uplink, SUL) band", an "SUL carrier", or an "SUL resource". Uplink transmission is performed by using a time domain resource provided by the SUL carrier, so that coverage in a cell edge scenario can be improved.

In existing spectrum planning, it is difficult to obtain spectrum resources of the SUL carrier. There is no dedicated frequency band that can be used as an SUL resource only for uplink transmission. In addition, with the development of diversified 5G services, SULs are used to meet both a requirement for an uplink coverage area and a requirement for uplink capacity improvement. Therefore, more SUL resources need to be provided. In conclusion, how to deploy SUL resources more effectively and flexibly and improve uplink coverage by using SULs is a problem that urgently needs to be resolved.

SUMMARY

This application provides a resource determining method and apparatus. According to the method, a time domain resource of an SUL carrier may be configured, so that SUL transmission is not affected by a service, for example, downlink transmission of the SUL carrier. This improves transmission reliability and an uplink transmission capacity.

According to a first aspect, a resource determining method is provided, including: sending first indication information to a terminal device, where the first indication information indicates M time domain resources of a first uplink carrier, the first uplink carrier supports supplementary uplink SUL transmission, the M time domain resources are time domain resources that are in N time domain resources included in the first uplink carrier and that are used for SUL transmission, the N time domain resources include an uplink resource and/or a flexible time domain resource, the time domain resource includes a slot and/or a symbol, and M<N; and receiving a first uplink signal and/or an uplink channel by using the M time domain resources of the first uplink carrier.

Optionally, in this embodiment of this application, a case in which M=N may be further included. It should be understood that a dedicated SUL carrier is set in the conventional technology, and all uplink resources of the SUL carrier are used for uplink transmission. According to the method provided in this embodiment of this application, all or some time domain resources of the SUL carrier may be configured to send an uplink signal/uplink channel. Alternatively, in a period of time, all time domain resources of the SUL carrier are configured for uplink transmission. Compared with a case in which all time domain resources of the SUL carrier are used for uplink transmission at any time, this configuration manner is more flexible, and resource utilization is higher.

According to the foregoing technical solution, in this embodiment of this application, time domain resources available to one or more SUL carriers may be configured. When a band in which the SUL carrier is located multiplexes a TDD band or a low-frequency FDD band, some time domain resources of the SUL carrier may support some downlink transmission. According to this embodiment of this application, the available time domain resource used for uplink transmission is configured for the SUL carrier, so that SUL transmission is not affected by a service, for example, downlink transmission of the SUL carrier. This improves transmission reliability and further improves the uplink transmission capacity. In addition, some time domain resources of the one or more SUL carriers may be configured as dynamic or semi-static time domain resources for another service to use, so that resource utilization can be improved.

It should be understood that, in this embodiment of this application, the first uplink carrier may also be referred to as an "SUL carrier", and the system may include one or more first uplink carriers, in other words, include one or more SUL carriers. In this embodiment of this application, one SUL carrier is used as an example to describe a method for configuring an available resource for the SUL carrier. A quantity of SUL carriers (first uplink carriers) is not limited in this embodiment of this application.

In a possible scenario, a base station may provide carriers for a plurality of terminal devices. For example, the base station may provide an NR carrier for a first terminal device, used for uplink transmission and downlink transmission (NUL and NDL) of the terminal device. In addition, the base station may further provide an LTE carrier for a second terminal device, used for uplink transmission and downlink transmission (NUL and NDL) of the second terminal device. Optionally, a frequency channel number of a band in which the NR carrier of the first terminal device is located may be higher than a frequency channel number of a band in which the LTE carrier of the second terminal device is located. In this scenario, with reference to this embodiment of this application, the SUL carrier of the first terminal device may multiplex an LTE carrier of a lower frequency band of the second terminal device.

Alternatively, in another possible scenario, both the first terminal device and the second terminal device may be terminal devices operating in NR, and the base station provides an NR carrier for each of the first terminal device and the second terminal device. Optionally, a frequency band range of a frequency band in which the NR carrier of the first terminal device is located may be different from a frequency band range of a frequency band in which the NR carrier of the second terminal device is located. In this scenario, with reference to this embodiment of this application, the SUL carrier of the first terminal device may multiplex an NR carrier of a lower frequency band of the second terminal device, or the SUL carrier of the second terminal device may multiplex an NR carrier of a lower frequency band of the first terminal device. It should be understood that an available scenario is not limited in this embodiment of this application.

Optionally, the band in which the SUL carrier is located may multiplex an LTE TDD band or a low-frequency FDD band for NR deployment. Specifically, the base station may configure an available SUL carrier for the terminal device, predefine an associated SUL carrier for an NDL/NUL band of the terminal device, or the like. The manner is described in detail in another related patent application, and details are not described in this embodiment of this application.

It should be further understood that, in this embodiment of this application, the first uplink carrier that supports supplementary uplink SUL transmission may include the N time domain resources, and the time domain resource may be specifically a "slot (time slot)" and/or a "time domain symbol (symbol)" described above.

Optionally, the N time domain resources of the first uplink carrier may include one or more of a time domain resource configured for uplink transmission (marked as "U"), a flexible time domain resource (flexible, marked as "F"), and a disabled time domain resource (marked as "D").

According to the method provided in this embodiment of this application, slots and/or symbols used for sending an uplink signal and/or an uplink channel on one or more SUL carriers may be configured, or a quantity of slots or symbols used for sending the first uplink signal and/or the uplink channel on the SUL carrier may be configured. This is not limited in this embodiment of this application.

In a possible implementation, the base station may notify the terminal device of only information about the M time domain resources by using the first indication information, for example, information such as locations and a quantity of the M time domain resources. The terminal device may determine, by using the information about the locations and the quantity of the M time domain resources that are indicated by the first indication information, a time domain resource used for sending the first uplink signal and/or the uplink channel.

With reference to the first aspect, in some possible implementations, when the N time domain resources include a flexible time domain resource, the first indication information further indicates K flexible time domain resources, the flexible time domain resource is used for SUL transmission or downlink transmission, and K<N. The receiving a first uplink signal and/or an uplink channel by using the M time domain resources of the first uplink carrier includes: receiving the first uplink signal and/or the uplink channel by using the M time domain resources and the K flexible time domain resources of the first uplink carrier.

With reference to the first aspect and the foregoing implementations, in some possible implementations, the first indication information is carried in a system information block SIB; or the first indication information is carried in downlink control information DCI; or the first indication information is carried in radio resource control RRC dedicated signaling.

It should be understood that the base station may send the first indication information to the terminal device in different manners. In other words, the first indication information may be carried in different messages.

With reference to the first aspect and the foregoing implementations, in some possible implementations, a band in which the first uplink carrier is located further includes another resource used for downlink transmission, and the band in which the first uplink carrier is located is a TDD band.

It should be understood that, in this embodiment of this application, the band in which the first uplink carrier is located is a TDD band, and the band in which the first uplink carrier is located further includes another resource used for downlink transmission. In other words, the one or more SUL carriers in this embodiment of this application multiplex an existing LTE TDD band or a low-frequency FDD band deployed for NR, and the one or more SUL carriers are different from the dedicated SUL carrier configured in the conventional technology. Specifically, any resource in the dedicated SUL carrier configured in the conventional technology may be used for uplink transmission, that is, sending a PUCCH/PUSCH.

With reference to the first aspect and the foregoing implementations, in some possible implementations, a slot and/or a symbol used by the first uplink carrier are/is configured as a subset of uplink slots and/or symbols and flexible slots and/or symbols to which the band in which the first uplink carrier is located belongs; or a slot and/or a symbol used by the first uplink carrier are/is configured as a subset of uplink slots and/or symbols or flexible slots and/or symbols to which the band in which the first uplink carrier is located belongs.

It should be understood that the "subset" herein may include slots in which the SUL carrier is configured based on a same quantity of uplink slots and/or flexible slots, or symbols in which the SUL carrier is configured based on a same quantity of uplink symbols and/or flexible symbols, or slots in which the SUL carrier is configured based on a quantity less than a quantity of uplink slots and/or a quantity of flexible slots included in the band in which the SUL carrier is located, or symbols in which the SUL carrier is configured based on a quantity less than a quantity of uplink symbols and/or a quantity of flexible symbols included in the band in which the SUL carrier is located. This is not limited in this embodiment of this application.

With reference to the first aspect and the foregoing implementations, in some possible implementations, when the N time domain resources include K flexible time domain resources, the method further includes: sending second indication information to the terminal device. The second indication information indicates L time domain resources that are in the K flexible time domain resources and that are used for SUL transmission, the L time domain resources include L0 uplink resources and L1 flexible time domain resources, and $0 \leq L \leq K$. The receiving a first uplink signal and/or an uplink channel by using the M time domain resources of the first uplink carrier includes: receiving the first uplink signal and/or the uplink channel by using the M time domain resources and the L time domain resources of the first uplink carrier.

It should be understood that the L time domain resources herein may include the L0 uplink resources and the L1 flexible time domain resources. In other words, the L time domain resources herein may include L0 resources configured as "U" and L1 flexible time domain resources configured as "F".

It should be further understood that, after configuring the time domain resources of the one or more SUL carriers for the terminal device, the base station may further modify the K flexible time domain resources that have been configured for the one or more SUL carriers based on different scenarios and requirements, that is, modify a configuration of flexible time domain resources by using the second indication information provided in this embodiment of this application.

With reference to the first aspect and the foregoing implementations, in some possible implementations, the second indication information is carried in radio resource control RRC dedicated signaling, or the second indication information is carried in downlink control information DCI.

Optionally, when the first indication information is sent by using the SIB, the second indication information may be carried in the radio resource control RRC dedicated signaling. Specifically, the configuration of flexible time domain resources of the SUL carrier is further modified by using the RRC dedicated signaling.

Alternatively, when the first indication information is sent by using the SIB, the second indication information may be further carried in the downlink control information DCI or a MAC CE. Specifically, in the foregoing implementations, the second indication information is sent to the terminal device by using the DCI or the MAC CE, to further modify the flexible time domain resource F configured in the first indication information.

With reference to the first aspect and the foregoing implementations, in some possible implementations, the method further includes: sending third indication information to the terminal device. The third indication information indicates S time domain resources that are in the L1 flexible time domain resources and that are used for uplink transmission, and $0 \leq S \leq L1$. The receiving a first uplink signal and/or an uplink channel by using the M time domain resources of the first uplink carrier includes: receiving the first uplink signal and/or the uplink channel by using the M time domain resources, the L0 uplink resources, and the S time domain resources of the first uplink carrier.

It should be understood that the S time domain resources herein may include S0 uplink resources and S1 flexible time domain resources. In other words, the S time domain resources herein may include S0 resources configured as "U" and S1 flexible time domain resources configured as "F".

It should be further understood that the base station may further modify the L1 configured flexible time domain resources of the one or more SUL carriers based on different scenarios and requirements, that is, modify the configuration of flexible time domain resource by using the third indication information provided in this embodiment of this application.

For example, the base station first sends the first indication information to the terminal device, configures the time domain resources of the one or more SUL carriers, and then sends the second indication information to the terminal device. After modifying the flexible time domain resources of the one or more SUL carriers, the base station may further modify the configured flexible time domain resources of the one or more SUL carriers by using the third indication information provided in this embodiment of this application.

With reference to the first aspect and the foregoing implementations, in some possible implementations, the third indication information is carried in downlink control information DCI, and the DCI indicates one or more first uplink carriers used for SUL transmission.

Optionally, in the DCI or the MAC CE, a specified slot and/or symbol on the SUL carrier may further be configured as a time domain resource in which the first uplink signal/channel may be sent. For example, the DCI or the MAC CE may include the third indication information, to re-indicate a configuration status of the flexible time domain resources of the SUL carrier in a time period.

With reference to the first aspect and the foregoing implementations, in some possible implementations, when n first uplink carriers are indicated by downlink control information DCI, the DCI specifically indicates a set of slot format combinations, the set of slot format combinations is used to configure the n first uplink carriers, each slot format combination in the set of slot format combinations includes m single slot format indexes, and m is determined according to the following formula $K_1/K_{min}+K_2/K_{min}+\ldots+K_n/K_{min}+K_{n+1}/K_{min}=m$, where $K_1, K_2, \ldots, K_n$, and $K_{n+1}$ are different reference subcarrier spacing SCSs of n+1 uplink carriers of the terminal device, $K_{min}$ is a minimum reference subcarrier spacing SCS of the uplink carriers of the terminal device, the n+1 uplink carriers include the n first uplink carriers and one normal uplink carrier, and the m single slot format indexes are divided according to $K_1/K_{min}, K_2/K_{min}, \ldots, K_n/K_{min}$, and $K_{n+1}/K_{min}$, to indicate slot configurations of the n+1 uplink carriers of the terminal device.

With reference to the first aspect and the foregoing implementations, in some possible implementations, the single slot format index includes at least one of the following: The single slot format index is the same as a single slot format index configured for the TDD band in which the first uplink carrier is located; or a predefined first slot format, indicating the time domain resource used for SUL transmission; or a predefined second slot format, indicating the time domain resource used for SUL transmission and the flexible time domain resource.

With reference to the first aspect and the foregoing implementations, in some possible implementations, when the first indication information is carried in the SIB or the RRC dedicated signaling, the first indication information further includes at least one configuration pattern and a reference subcarrier spacing SCS that indicates the first uplink carrier, and each configuration pattern includes a configuration cycle of a time domain resource of the first uplink carrier, and one or more of a quantity of uplink slots and/or symbols in the cycle, a quantity of flexible slots and/or symbols in the cycle, and a quantity of disabled resource slots and/or symbols in the cycle.

In conclusion, when the band in which the SUL carrier is located multiplexes a TDD band or a low-frequency FDD band, some time domain resources of the SUL carrier may support some downlink transmission. According to this embodiment of this application, the available time domain resource used for uplink transmission is configured for the SUL carrier, so that SUL transmission is not affected by a service, for example, downlink transmission of the SUL carrier. This improves transmission reliability and further improves the uplink transmission capacity.

In addition, some time domain resources of the one or more SUL carriers may be configured as dynamic or semi-static time domain resources for another service to use, so that resource utilization can be improved.

According to a second aspect, a resource determining method is provided, including: receiving first indication information sent by a network device, where the first indication information indicates M time domain resources of a first uplink carrier, the first uplink carrier supports supplementary uplink SUL transmission, the M time domain resources are time domain resources that are in N time domain resources included in the first uplink carrier and that are used for SUL transmission, the N time domain resources include an uplink resource and/or a flexible time domain resource, the time domain resource includes a slot and/or a symbol, and M<N; and sending a first uplink signal and/or an uplink channel based on the first indication information by using the M time domain resources of the first uplink carrier.

With reference to the second aspect, in some possible implementations, when the N time domain resources include a flexible time domain resource, the first indication information further indicates K flexible time domain resources, the flexible time domain resource is used for SUL transmission or downlink transmission, and K<N. The sending a first uplink signal and/or an uplink channel by using the M time domain resources of the first uplink carrier includes: sending the first uplink signal and/or the uplink channel by using the M time domain resources and the K flexible time domain resources of the first uplink carrier.

With reference to the second aspect and the foregoing implementations, in some possible implementations, the first indication information is carried in a system information block SIB; or the first indication information is carried in downlink control information DCI; or the first indication information is carried in radio resource control RRC dedicated signaling.

With reference to the second aspect and the foregoing implementations, in some possible implementations, a band in which the first uplink carrier is located further includes another resource used for downlink transmission, and the band in which the first uplink carrier is located is a TDD band.

With reference to the second aspect and the foregoing implementations, in some possible implementations, a slot and/or a symbol used by the first uplink carrier are/is configured as a subset of uplink slots and/or symbols and flexible slots and/or symbols to which the band in which the first uplink carrier is located belongs; or a slot and/or a symbol used by the first uplink carrier are/is configured as a subset of uplink slots and/or symbols or flexible slots and/or symbols to which the band in which the first uplink carrier is located belongs.

With reference to the second aspect and the foregoing implementations, in some possible implementations, when the N time domain resources include K flexible time domain resources, the method further includes: receiving second indication information sent by the network device. The second indication information indicates L time domain resources that are in the K flexible time domain resources and that are used for SUL transmission, $0 \leq L \leq K$, and the L time domain resources include L0 uplink resources and L1 flexible time domain resources. The sending a first uplink signal and/or an uplink channel by using the M time domain resources of the first uplink carrier includes: sending the first uplink signal and/or the uplink channel by using the M time domain resources and the L time domain resources of the first uplink carrier.

With reference to the second aspect and the foregoing implementations, in some possible implementations, the second indication information is carried in radio resource control RRC dedicated signaling; or the second indication information is carried in downlink control information DCI.

With reference to the second aspect and the foregoing implementations, in some possible implementations, the method further includes: receiving third indication information sent by the network device. The third indication information indicates S time domain resources that are in the L1 time domain resources and that are used for uplink transmission, and $0 \leq S \leq L1$.

The S time domain resources include S0 uplink resources and S1 flexible time domain resources. The sending a first uplink signal and/or an uplink channel by using the M time domain resources of the first uplink carrier includes: sending the first uplink signal and/or the uplink channel by using the M time domain resources, the L0 uplink resources, and the S time domain resources of the first uplink carrier.

With reference to the second aspect and the foregoing implementations, in some possible implementations, the third indication information is carried in downlink control information DCI, and the DCI indicates one or more first uplink carriers used for SUL transmission.

With reference to the second aspect and the foregoing implementations, in some possible implementations, when n first uplink carriers are indicated by downlink control information DCI, the DCI specifically indicates a set of slot format combinations, the set of slot format combinations is used to configure the n first uplink carriers, each slot format combination in the set of slot format combinations includes m single slot format indexes, and m is determined according to the following formula: $K_1/K_{min}+K_2/K_{min}+ \ldots +K_n/K_{min}+K_{n+1}/K_{min}=m$, where $K_1, K_2, \ldots, K_n$, and $K_{n+1}$ are different reference subcarrier spacing SCSs of n+1 uplink carriers of the terminal device, $K_{min}$ is a minimum reference subcarrier spacing SCS of the uplink carriers of the terminal device, the n+1 uplink carriers include the n first uplink carriers and one normal uplink carrier, and the m single slot format indexes are divided according to $K_1/K_{min}, K_2/K_{min}, \ldots, K_n/K_{min}$, and $K_{n+1}/K_{min}$, to indicate slot configurations of the n+1 uplink carriers of the terminal device.

With reference to the second aspect and the foregoing implementations, in some possible implementations, the single slot format index includes at least one of the following: The single slot format index is the same as a single slot format index configured for the TDD band in which the first uplink carrier is located, and a configuration of a downlink symbol in the single slot format is ignored; or a predefined first slot format, indicating the time domain resource used for SUL transmission; or a predefined second slot format, indicating the time domain resource used for SUL transmission and the flexible time domain resource.

With reference to the second aspect and the foregoing implementations, in some possible implementations, when the first indication information is carried in the SIB or the RRC dedicated signaling, the first indication information further includes at least one configuration pattern and a reference subcarrier spacing SCS that indicates the first uplink carrier, and each configuration pattern includes a configuration cycle of a time domain resource of the first uplink carrier, and one or more of a quantity of uplink slots and/or symbols in the cycle, a quantity of flexible slots and/or symbols in the cycle, and a quantity of disabled resource slots and/or symbols in the cycle.

According to a third aspect, an apparatus is provided, including: a sending unit, configured to send first indication information to a terminal device, where the first indication information indicates M time domain resources of a first uplink carrier, the first uplink carrier supports supplementary uplink SUL transmission, the M time domain resources are time domain resources that are in N time domain resources included in the first uplink carrier and that are used for SUL transmission, the N time domain resources include an uplink resource and/or a flexible time domain resource, the time domain resource includes a slot and/or a symbol, and M<N; and a receiving unit, configured to receive a first uplink signal and/or an uplink channel by using the M time domain resources of the first uplink carrier.

With reference to the third aspect, in some possible implementations, when the N time domain resources include a flexible time domain resource, the first indication information further indicates K flexible time domain resources. The flexible time domain resource is used for SUL transmission or downlink transmission, and K<N. The receiving unit is further configured to receive the first uplink signal and/or the uplink channel by using the M time domain resources and the K flexible time domain resources of the first uplink carrier.

With reference to the third aspect and the foregoing implementations, in some possible implementations, the first indication information is carried in a system information block SIB; or the first indication information is carried in downlink control information DCI; or the first indication information is carried in radio resource control RRC dedicated signaling.

With reference to the third aspect and the foregoing implementations, in some possible implementations, a band in which the first uplink carrier is located further includes another resource used for downlink transmission, and the band in which the first uplink carrier is located is a TDD band.

With reference to the third aspect and the foregoing implementations, in some possible implementations, a slot and/or a symbol used by the first uplink carrier are/is configured as a subset of uplink slots and/or symbols and flexible slots and/or symbols to which the band in which the first uplink carrier is located belongs; or a slot and/or a symbol used by the first uplink carrier are/is configured as a subset of uplink slots and/or symbols or flexible slots and/or symbols to which the band in which the first uplink carrier is located belongs.

With reference to the third aspect and the foregoing implementations, in some possible implementations, when the N time domain resources include K flexible time domain resources, the sending unit is further configured to send second indication information to the terminal device. The second indication information indicates L time domain resources that are in the K flexible time domain resources and that are used for SUL transmission, $0 \le L \le K$, the L time domain resources include L0 uplink resources and L1 flexible time domain resources, and $0 \le L \le K$. That the receiving unit is further configured to receive a first uplink signal and/or an uplink channel by using the M time domain resources of the first uplink carrier includes: receiving the first uplink signal and/or the uplink channel by using the M time domain resources and the L time domain resources of the first uplink carrier.

With reference to the third aspect and the foregoing implementations, in some possible implementations, the second indication information is carried in radio resource control RRC dedicated signaling, or the second indication information is carried in downlink control information DCI.

With reference to the third aspect and the foregoing implementations, in some possible implementations, the sending unit is further configured to send third indication information to the terminal device. The third indication information indicates S time domain resources that are in the L1 flexible time domain resources and that are used for uplink transmission, $0 \le S \le L1$, and the S time domain resources include S0 uplink resources and S1 flexible time domain resources. The receiving unit is further configured to receive the first uplink signal and/or the uplink channel by using the M time domain resources, the L0 uplink resources, and the S time domain resources of the first uplink carrier.

With reference to the third aspect and the foregoing implementations, in some possible implementations, the third indication information is carried in downlink control information DCI, and the DCI indicates one or more first uplink carriers used for SUL transmission.

With reference to the third aspect and the foregoing implementations, in some possible implementations, when n first uplink carriers are indicated by downlink control information DCI, the DCI specifically indicates a set of slot format combinations, the set of slot format combinations is used to configure the n first uplink carriers, each slot format combination in the set of slot format combinations includes m single slot format indexes, and m is determined according to the following formula: $K_1/K_{min}+K_2/K_{min}+ \ldots +K_n/K_{min}+K_{n+1}/K_{min}=m$, where $K_1, K_2, \ldots, K_n$, and $K_{n+1}$ are different reference subcarrier spacing SCSs of n+1 uplink carriers of the terminal device, $K_{min}$ is a minimum reference subcarrier spacing SCS of the uplink carriers of the terminal device, the n+1 uplink carriers include the n first uplink carriers and one normal uplink carrier, and the m single slot format indexes are divided according to $K_1/K_{min}, K_2/K_{min}, \ldots, K_n/K_{min}$, and $K_{n+1}/K_{min}$, to indicate slot configurations of the n+1 uplink carriers of the terminal device.

With reference to the third aspect and the foregoing implementations, in some possible implementations, the single slot format index includes at least one of the following: The single slot format index is the same as a single slot format index configured for the TDD band in which the first uplink carrier is located; or a predefined first slot format, indicating the time domain resource used for SUL transmission; or a predefined second slot format, indicating the time domain resource used for SUL transmission and the flexible time domain resource.

With reference to the third aspect and the foregoing implementations, in some possible implementations, when the first indication information is carried in the SIB or the RRC dedicated signaling, the first indication information further includes at least one configuration pattern and a reference subcarrier spacing SCS that indicates the first uplink carrier, and each configuration pattern includes a configuration cycle of a time domain resource of the first uplink carrier, and one or more of a quantity of uplink slots and/or symbols in the cycle, a quantity of flexible slots and/or symbols in the cycle, and a quantity of disabled resource slots and/or symbols in the cycle.

According to a fourth aspect, an apparatus is provided, including: a receiving unit, configured to receive first indication information sent by a network device, where the first indication information indicates M time domain resources of a first uplink carrier, the first uplink carrier supports supplementary uplink SUL transmission, the M time domain resources are time domain resources that are in N time domain resources included in the first uplink carrier and that are used for SUL transmission, the N time domain resources include an uplink resource and/or a flexible time domain resource, the time domain resource includes a slot and/or a symbol, and M<N; and a sending unit, configured to send a first uplink signal and/or an uplink channel based on the first indication information by using the M time domain resources of the first uplink carrier.

With reference to the fourth aspect, in some possible implementations, when the N time domain resources include a flexible time domain resource, the first indication information further indicates K flexible time domain resources. The flexible time domain resource is used for SUL transmission or downlink transmission, and K<N. The sending unit is further configured to send the first uplink signal and/or the uplink channel by using the M time domain resources and the K flexible time domain resources of the first uplink carrier.

With reference to the fourth aspect and the foregoing implementations, in some possible implementations, the first indication information is carried in a system information block SIB; or the first indication information is carried in downlink control information DCI; or the first indication information is carried in radio resource control RRC dedicated signaling.

With reference to the fourth aspect and the foregoing implementations, in some possible implementations, a band in which the first uplink carrier is located further includes another resource used for downlink transmission, and the band in which the first uplink carrier is located is a TDD band.

With reference to the fourth aspect and the foregoing implementations, in some possible implementations, a slot and/or a symbol used by the first uplink carrier are/is configured as a subset of uplink slots and/or symbols and flexible slots and/or symbols to which the band in which the first uplink carrier is located belongs; or a slot and/or a symbol used by the first uplink carrier are/is configured as a subset of uplink slots and/or symbols or flexible slots and/or symbols to which the band in which the first uplink carrier is located belongs.

With reference to the fourth aspect and the foregoing implementations, in some possible implementations, when the N time domain resources include K flexible time domain resources, the receiving unit is further configured to receive second indication information sent by the network device. The second indication information indicates L time domain resources that are in the K flexible time domain resources and that are used for SUL transmission, $0 \leq L \leq K$, and the L time domain resources include L0 uplink resources and L1 flexible time domain resources. The sending unit is further configured to send the first uplink signal and/or the uplink channel by using the M time domain resources and the L flexible time domain resources of the first uplink carrier.

With reference to the fourth aspect and the foregoing implementations, in some possible implementations, the second indication information is carried in radio resource control RRC dedicated signaling; or the second indication information is carried in downlink control information DCI.

With reference to the fourth aspect and the foregoing implementations, in some possible implementations, the receiving unit is further configured to receive third indication information sent by the network device. The third indication information indicates S time domain resources that are in the L1 flexible time domain resources and that are used for uplink transmission, $0 \leq S \leq L1$, and the S time domain resources include S0 uplink resources and S1 flexible time domain resources. The sending unit is further configured to send the first uplink signal and/or the uplink channel by using the M time domain resources, the L0 uplink resources, and the S time domain resources of the first uplink carrier.

With reference to the fourth aspect and the foregoing implementations, in some possible implementations, the third indication information is carried in downlink control information DCI, and the DCI indicates one or more first uplink carriers used for SUL transmission.

With reference to the fourth aspect and the foregoing implementations, in some possible implementations, when n first uplink carriers are indicated by downlink control information DCI, the DCI specifically indicates a set of slot format combinations, the set of slot format combinations is used to configure the n first uplink carriers, each slot format combination in the set of slot format combinations includes m single slot format indexes, and m is determined according to the following formula $K_1/K_{min}+K_2/K_{min}+ \ldots +K_n/K_{min}+K_{n+1}/K_{min}=m$, where $K_1, K_2, \ldots, K_n$, and $K_{n+1}$ are different reference subcarrier spacing SCSs of n+1 uplink carriers of the terminal device, $K_{min}$ is a minimum reference subcarrier spacing SCS of the uplink carriers of the terminal device, the n+1 uplink carriers include the n first uplink carriers and one normal uplink carrier, and the m single slot format indexes are divided according to $K_1/K_{min}, K_2/K_{min}, \ldots, K_n/K_{min}$ and $K_{n+1}/K_{min}$, to indicate slot configurations of the n+1 uplink carriers of the terminal device.

With reference to the fourth aspect and the foregoing implementations, in some possible implementations, the single slot format index includes at least one of the following: The single slot format index is the same as a single slot format index configured for the TDD band in which the first uplink carrier is located, and a configuration of a downlink symbol in the single slot format is ignored; or a predefined first slot format, indicating the time domain resource used for SUL transmission; or a predefined second slot format, indicating the time domain resource used for SUL transmission and the flexible time domain resource.

With reference to the fourth aspect and the foregoing implementations, in some possible implementations, when the first indication information is carried in the SIB or the RRC dedicated signaling, the first indication information further includes at least one configuration pattern and a reference subcarrier spacing SCS that indicates the first uplink carrier, and each configuration pattern includes a configuration cycle of a time domain resource of the first uplink carrier, and one or more of a quantity of uplink slots and/or symbols in the cycle, a quantity of flexible slots and/or symbols in the cycle, and a quantity of disabled resource slots and/or symbols in the cycle.

According to a fifth aspect, a communication apparatus is provided. The communication apparatus can implement functions of the network device (for example, the base station) in the method designs of the first aspect. The function may be implemented by hardware, or may be implemented by hardware by executing corresponding software. The hardware or the software includes one or more units corresponding to the foregoing functions.

According to a sixth aspect, a communication apparatus is provided, and the communication apparatus has functions of implementing the terminal device in the method designs of the second aspect. The function may be implemented by hardware, or may be implemented by hardware by executing corresponding software. The hardware or the software includes one or more units corresponding to the foregoing functions.

According to a seventh aspect, a network device is provided, and includes a transceiver and a processor. Optionally, the network device further includes a memory. The processor is configured to control the transceiver to send and receive a signal. The memory is configured to store a computer program. The processor is configured to invoke the computer program from the memory and run the computer program, so that the network device performs the method according to the second aspect or any possible implementation of the second aspect.

According to an eighth aspect, a terminal device is provided. The terminal device includes a transceiver and a processor. Optionally, the terminal device further includes a memory. The processor is configured to control the transceiver to send and receive a signal. The memory is configured to store a computer program. The processor is configured to invoke the computer program from the memory and run the computer program, so that the terminal device performs the method according to the first aspect or any possible implementation of the first aspect.

According to a ninth aspect, a communication system is provided. The system includes the network device in the third aspect and the terminal device in the fourth aspect.

According to a tenth aspect, a communication apparatus is provided. The communication apparatus may be the network device in the foregoing method designs, or may be a chip disposed in the network device. The communication apparatus includes a processor, coupled to a memory, and may be configured to execute instructions in the memory, to implement the method performed by the network device according to the first aspect or any possible implementation of the first aspect. Optionally, the communication apparatus further includes the memory. Optionally, the communication apparatus further includes a communication interface, and the processor is coupled to the communication interface.

When the communication apparatus is the network device, the communication interface may be a transceiver or an input/output interface.

When the communication apparatus is the chip configured in the network device, the communication interface may be an input/output interface.

Optionally, the transceiver may be a transceiver circuit. Optionally, the input/output interface may be an input/output circuit.

According to an eleventh aspect, a communication apparatus is provided. The communication apparatus may be the terminal device in the foregoing method designs, or may be a chip disposed in the terminal device. The communication apparatus includes a processor, coupled to a memory, and may be configured to execute instructions in the memory, to implement the method performed by the terminal device according to the second aspect or any possible implementation of the second aspect. Optionally, the communication apparatus further includes the memory. Optionally, the communication apparatus further includes a communication interface, and the processor is coupled to the communication interface.

When the communication apparatus is the terminal device, the communication interface may be a transceiver or an input/output interface.

When the communication apparatus is the chip configured in the terminal device, the communication interface may be an input/output interface.

Optionally, the transceiver may be a transceiver circuit. Optionally, the input/output interface may be an input/output circuit.

According to a twelfth aspect, a computer program product is provided. The computer program product includes computer program code, and when the computer program code is run on a computer, the computer is enabled to perform the methods in the foregoing aspects.

According to a thirteenth aspect, a computer-readable storage medium is provided. The computer-readable storage medium stores program code, and when the computer program code is run on a computer, the computer is enabled to perform the methods according to the foregoing aspects.

BRIEF DESCRIPTION OF DRAWINGS

FIG. 8 is a schematic diagram of still another time domain resource configuration according to an embodiment of this application;

FIG. 9 is a schematic diagram of a resource determining apparatus according to an embodiment of this application;

FIG. 10 is a schematic diagram of another resource determining apparatus according to an embodiment of this application;

DESCRIPTION OF EMBODIMENTS

The following describes the technical solution in this application with reference to the accompanying drawings.

The technical solutions in embodiments of this application may be applied to various communication systems, for example, a long term evolution (long term evolution, LTE) system, an LTE frequency division duplex (frequency division duplex, FDD) system, an LTE time division duplex (time division duplex, TDD) system, a 5th generation (5th generation, 5G) mobile communication system or a new radio (new radio, NR) communication system, and a future mobile communication system.

Figure 1:
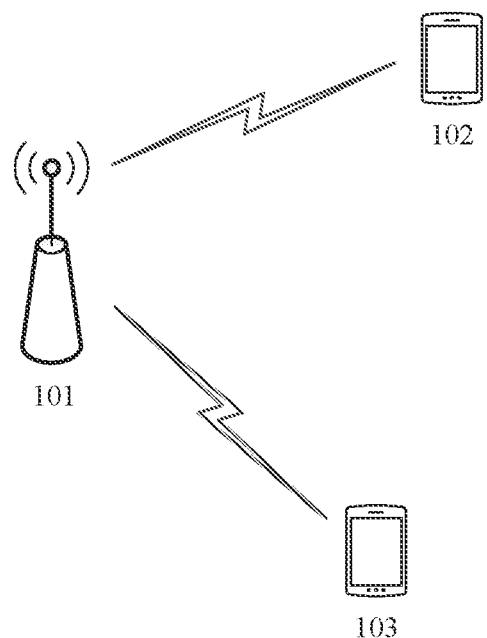
FIG. 1 is a schematic diagram of an architecture of a mobile communication system applicable to an embodiment of this application.

FIG. 1 is a schematic architectural diagram of a mobile communication system applicable to an embodiment of this application. As shown in FIG. 1, the wireless communication system may include at least one network device 101. The network device 101 communicates with one or more terminal devices (for example, a terminal device 102 and a terminal device 103 that are shown in FIG. 1). When the network device sends a signal, the network device is a transmit end, and the terminal device is a receive end. On the contrary, when the terminal device sends a signal, the terminal device is a transmit end, and the network device is a receive end.

The terminal device may be located at a fixed position, or may be mobile. FIG. 1 is only a schematic diagram. The communication system may further include another network device, for example, may further include a wireless relay device and a wireless backhaul device, which are not shown in FIG. 1. Types and quantities of network devices and terminal devices included in the mobile communication system are not limited in this embodiment of this application.

In the mobile communication system 100, a terminal device wirelessly accesses a network device in the mobile communication system. The radio access network device 101 may be a base station, an evolved NodeB (evolved NodeB, eNB), a home base station, an access point (access point, AP) in a wireless fidelity (wireless fidelity, Wi-Fi) system, a wireless relay node, a wireless backhaul node, a transmission point (transmission point, TP), a transmission reception point (transmission and reception point, TRP), a gNB in an NR system, or a component or a part of a device included in a base station, for example, a central unit (central unit, CU), a distributed unit (distributed unit, DU), or a baseband unit (baseband unit, BBU). It should be understood that a specific technology used by and a specific device form of the network device are not limited in embodiments of this application. In this application, unless otherwise specified, the network device is a radio access network device. In this application, the network device may be a network device itself, or may be a chip used in the network device to complete a wireless communication processing function.

The terminal device in the mobile communication system 100 may also be referred to as a terminal, user equipment (user equipment, UE), a mobile station (mobile station, MS), a mobile terminal (mobile terminal, MT), or the like. The terminal device in embodiments of this application may be a mobile phone (mobile phone), a tablet computer (Pad), or a computer with a wireless transceiver function, or may be a wireless terminal used in scenarios such as a virtual reality (virtual reality, VR), an augmented reality (augmented reality, AR), industrial control (industrial control), self-driving (self-driving), remote medical (remote medical), a smart grid (smart grid), transportation safety (transportation safety), a smart city (smart city), and a smart home (smart home). In this application, the terminal device and a chip that can be used in the terminal device are collectively referred to as a terminal device. It should be understood that a specific technology used by and a specific device form of the terminal device are not limited in embodiments of this application.

This embodiment of this application is applicable to downlink data transmission, or uplink data transmission, or device-to-device (device-to-device, D2D) data transmission. During downlink data transmission, a data sending device is a network device, and a data receiving device is a terminal device. After receiving downlink data, the terminal device sends feedback information to the network device, to notify the network device whether the downlink data is correctly received by the terminal device. During uplink data transmission, a data sending device is a terminal device, and a data receiving device is a network device. After receiving uplink data, the network device sends feedback information to the terminal device, to notify the terminal device whether the uplink data is correctly received by the network device. During D2D signal transmission, a data sending device is a terminal device, and a data receiving device is also a terminal device. A data transmission direction is not limited in this embodiment of this application.

It should be understood that division of manners, cases, types, and embodiments in embodiments of this application are only for ease of description, but should not constitute any special limitation, and features in various manners, types, cases, and embodiments may be combined when there is no contradiction.

It should be further understood that the terms "first", "second", and "third" in embodiments of this application are merely used for distinguishing, and should not be construed as any limitation on this application. For example, the "first uplink carrier" in embodiments of this application represents a resource used for SUL transmission.

It should be further understood that sequence numbers of the processes do not mean execution sequences in various embodiments of this application. The execution sequences of the processes should be determined according to functions and internal logic of the processes, and should not be construed as any limitation on the implementation processes of embodiments of this application.

It should be further noted that in embodiments of this application, "presetting" or "predefining" may be implemented by prestoring corresponding code or a table in a device (for example, including a terminal device and a network device), or in another manner that may indicate related information. For example, a predefined slot format in embodiments of this application may be a slot configuration manner formulated in a standard. A specific implementation of the predefined slot format is not limited in this application.

It should be noted that the term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. The following describes in detail technical solutions provided in this application with reference to the accompanying drawings.

To facilitate understanding of embodiments of this application, the following briefly describes several concepts in this application.

1. Slot (Time Slot) and Time Domain Symbol (Symbol)

A slot may be understood as a part of serial self-multiplexing of slot information dedicated to a single channel. A slot can be considered as a channel.

In embodiments of this application, a symbol is also referred to as a time domain symbol, and may be an orthogonal frequency division multiplexing (orthogonal frequency division multiplexing, OFDM) symbol or a single carrier frequency division multiple access (single carrier frequency division multiple access, SC-FDMA) symbol. SC-FDMA is also referred to as orthogonal frequency division multiplexing with transform precoding (orthogonal frequency division multiplexing with transform precoding, OFDM with TP). This is not limited in embodiments of this application.

For example, for a frame structure in an NR frequency division duplex (frequency division duplex, FDD) mode, duration of one frame is 10 ms, and each frame includes 10 subframes. A 30 kHz subcarrier is used as an example, each subframe includes 20 slots. Each subframe has two slots, and each slot is 0.5 ms and includes 14 OFDM symbols. Each slot in NR may have several resource blocks, and each resource block includes a plurality of subcarriers.

For a frame structure in an NR time division duplex (time division duplex, TDD) mode, duration of one frame is 10 ms, and includes 10 subframes whose duration is 1 ms. A 30 kHz subcarrier is used as an example, each subframe includes 20 slots. Each subframe has two slots, and each slot is 0.5 ms and includes 14 OFDM symbols. Therefore, it may be understood that the entire 10 ms frame is divided into several slots, which are used as data scheduling and transmission units, that is, transmission time intervals (transmission time intervals, TTIs). It should be understood that a frame structure is not limited in embodiments of this application.

It should be understood that, different carriers in NR may correspond to different reference subcarrier spacings (subcarrier spacings. SCSs). For example, SCSs are 15 kHz, 30 kHz, and 60 kHz. For different reference subcarrier spacings, one subframe includes different quantities of slots (slots). For a carrier whose SCS is 15 kHz, each subframe may include one slot. For a carrier whose SCS is 30 kHz, each subframe may include two slots. For a carrier whose SCS is 60 kHz, each subframe may include four slots. Each slot of carriers of different SCSs may include 14 symbols (symbols). Details are not described herein.

2. Physical Uplink Channel

A physical uplink channel is a channel used to carry uplink control information (uplink control information, UCI) and/or uplink data. For example, the physical uplink channel may include a physical uplink control channel (physical uplink control channel, PUCCH) and a physical uplink shared channel (physical uplink share channel, PUSCH) that are defined in an LTE protocol or an NR protocol, and another uplink channel that has the foregoing functions and that is defined as a network evolves.

3. Downlink Control Information (Download Control Information, DCI)

Downlink control information is mainly used to send downlink scheduling assignment information, and has a plurality of different formats, including but not limited to DCI formats 0-0, 0-1, 1-0, 1-1, 2-0, 2-1, 2-2, 2-3, and the like. It should be understood that a format of the DCI is not limited in embodiments of this application.

4. Supplementary Uplink (Supplementary Uplink, SUL)

A frequency band used at an initial stage of deployment of a 5G mobile communication system is higher than a frequency band of a 4th generation (4th generation, 4G) mobile communication system. An electromagnetic wave with a higher frequency has a greater attenuation, and a transmit power of a terminal is lower than that of a base station. Therefore, a terminal at a cell edge can receive a downlink signal from the base station, but the base station cannot receive an uplink signal from the terminal. As a result, an uplink coverage area is smaller than a downlink coverage area.

Figure 2:
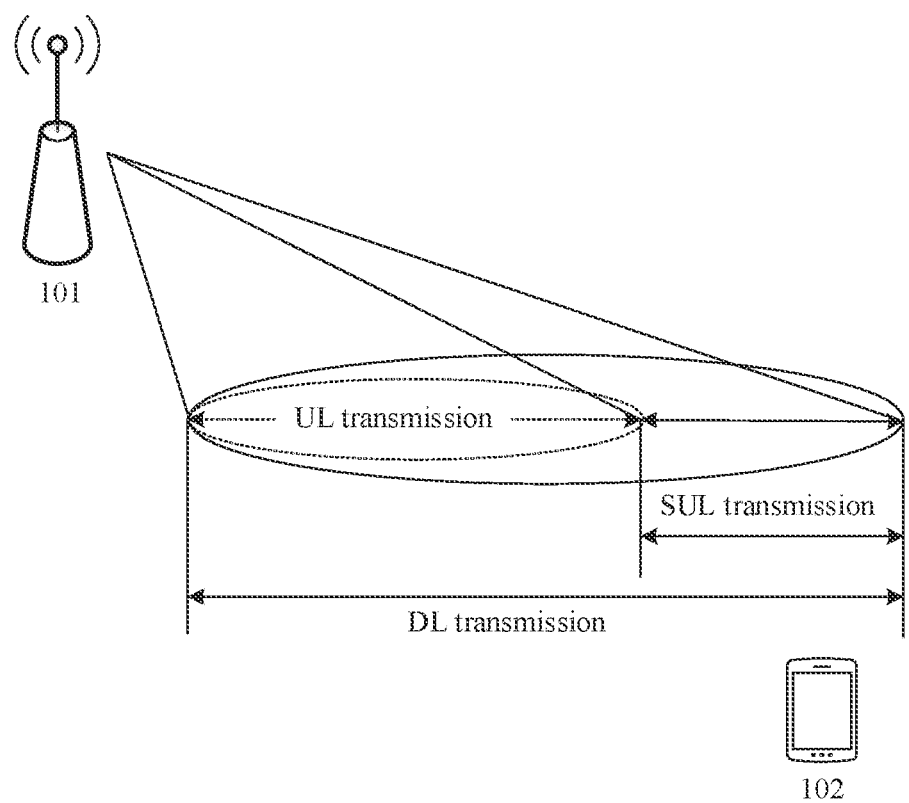
FIG. 2 is a schematic diagram of cell deployment.

FIG. 2 is a schematic diagram of cell deployment. Based on the background and the foregoing related descriptions, the base station is used as a network device, and a process of communication between a base station 101 and a terminal 102 is used as an example. As shown in FIG. 2, an NR cell may include a normal downlink (Normal downlink, NDL) carrier and a normal uplink (Normal uplink, NUL) carrier. With reference to FIG. 2 and the foregoing related descriptions, when a cell is currently deployed, a downlink (downlink, DL) coverage area of the network device 101 is greater than an uplink (uplink, UL) coverage area of the network device 101, or a coverage area of a normal downlink (normal downlink, NDL) is greater than a coverage area of a normal uplink (normal uplink, NUL). As shown in FIG. 2, a UL coverage area is less than a DL coverage area of a first frequency band.

To improve uplink coverage of a 5G cell, a supplementary uplink (supplementary uplink. SUL) carrier is introduced to NR. The carrier usually uses a low frequency, and therefore has smaller attenuation. This improves uplink coverage. Therefore, during actual deployment of an NR cell, one NR cell includes three carriers, for example, one downlink NDL carrier of a 3.5 gigahertz (Giga Hertz, GHz) frequency band, one NUL carrier of a 3.5 GHz frequency band, and one SUL carrier of a 1.8 GHz frequency band. An uplink service of the terminal device may be transmitted on the NUL and the SUL.

Figure 3:
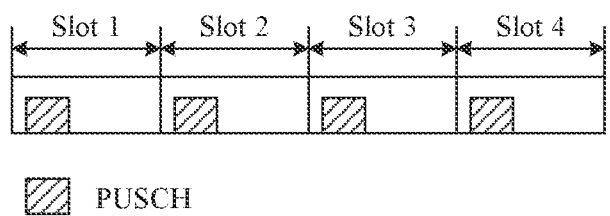
FIG. 3 is a schematic diagram of sending a physical uplink shared channel.

To improve uplink transmission reliability of a cell edge user, repeated sending of a PUCCH/PUSCH is supported in a current standard. Repeated sending of the PUCCH may be indicated by RRC configuration, and repeated sending of the PUSCH may be indicated by downlink control information (download control information, DCI) or radio resource control (radio resource control, RRC) signaling configuration. For example, the DCI indication may include DC dynamic scheduling and Configured Grant Type 2 grant-free scheduling, and the RRC configuration indication may include Configured Grant type 1 grant-free scheduling and the like. FIG. 3 is a schematic diagram of sending a physical uplink shared channel. As shown in FIG. 3, a repeatedly sent PUCCH/PUSCH may use a same time domain resource and/or a same frequency domain resource in each slot. Details are not described herein.

It should be understood that, in the conventional technology, an SUL frequency band configured for one cell is used only for uplink transmission. Currently, repeated transmission of the PUCCH/PUSCH is supported in the SUL frequency band. It is assumed that the SUL frequency band corresponds to an uplink symbol. In other words, a terminal considers that uplink transmission can be performed in any slot and symbol in the SUL frequency band. However, due to frequency band deployment and application resource limitations of an existing operator, to improve resource utilization, some resources in the SUL frequency band may be dynamically or semi-statically configured for another service, and may even support some downlink transmission. When some resources in the SUL frequency band are configured for another service for use, how to ensure that an original process of repeatedly sending, for example, a PUCCH and/or a PUSCH, in the SUL frequency band is not affected by the another service is a problem that urgently needs to be resolved currently.

An embodiment of this application provides an SUL frequency band configuration method. According to the method, a network device and a terminal device can determine a resource used for SUL transmission, to improve transmission reliability. It should be understood that, in this embodiment of this application, a base station 101 is used as the network device, and a process of transmission between the base station 101 and a terminal device 102 shown in FIG.

2 is used as an example to specifically describe the SUL frequency band configuration method in this application.

Figure 4A:
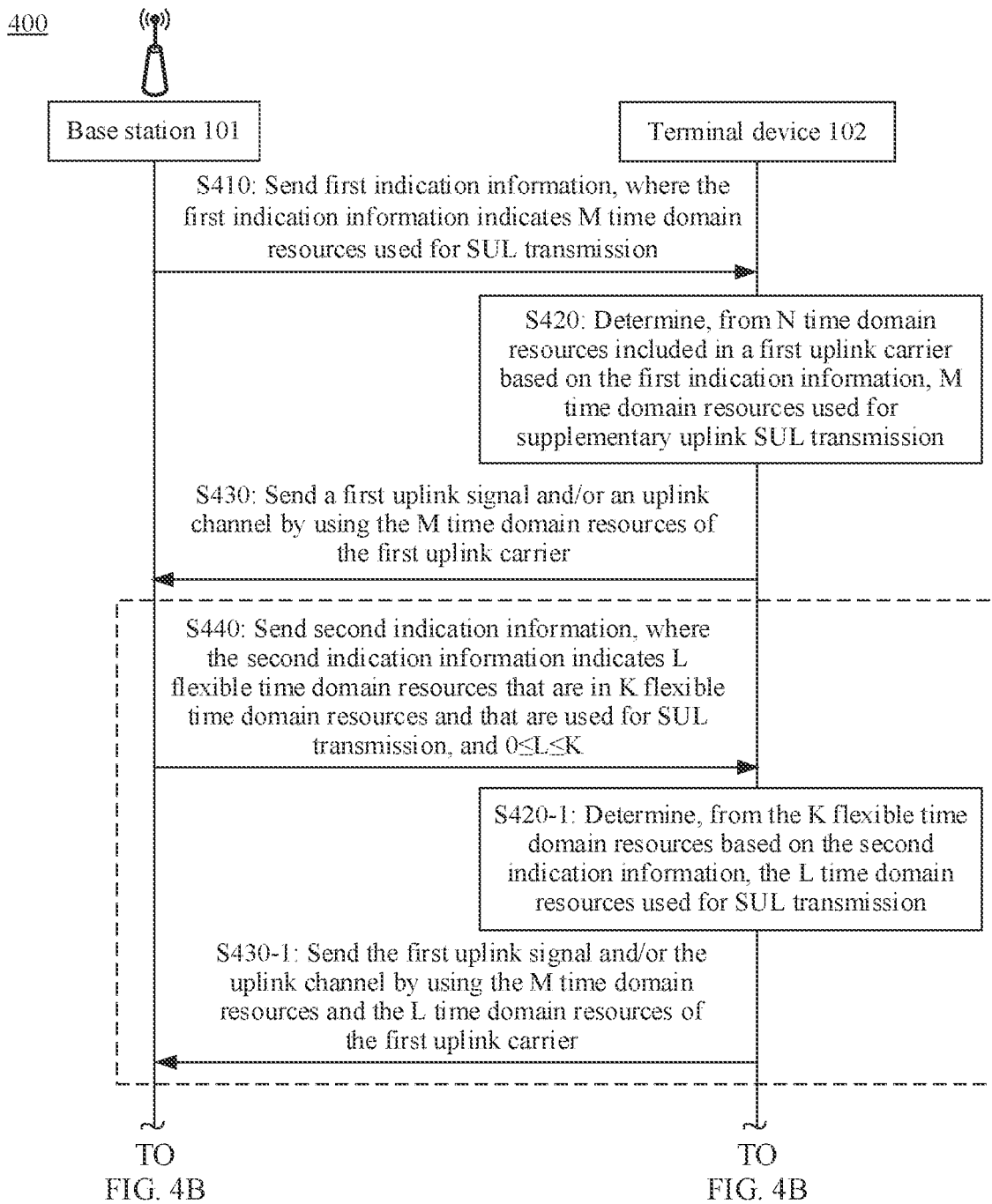
FIG. 4A and FIG. 4B are a schematic interaction diagram of a resource determining method according to an embodiment of this application.
Figure 4B:
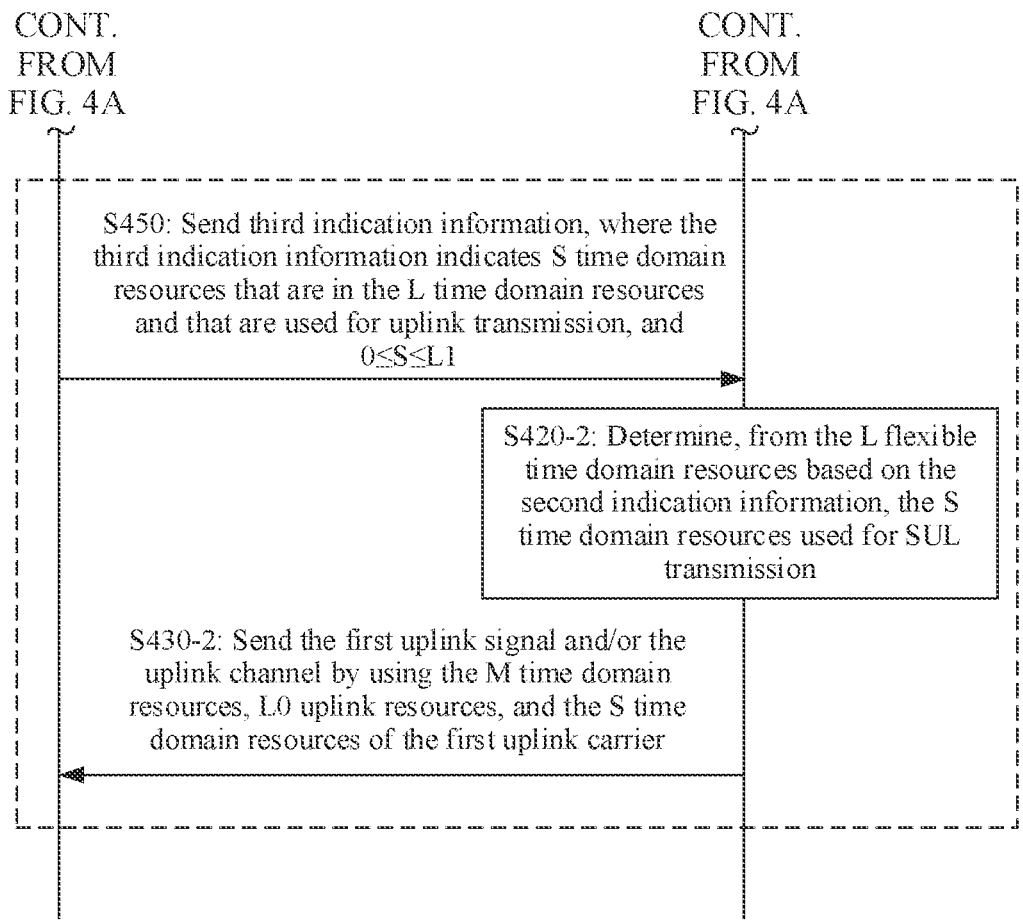

FIG. 4A and FIG. 4B are a schematic interaction diagram of a resource determining method 400 according to an embodiment of this application. It should be understood that this embodiment of this application may be applied to the scenario shown in FIG. 1 or FIG. 2. Specifically, the method 400 may be applied to the terminal device or the base station in the scenario. An NDL carrier, an NUL carrier, and one or more SUL carriers are configured between the terminal device 102 and the base station 101. This is not limited in this embodiment of this application.

As shown in FIG. 4A and FIG. 4B, the method 400 includes the following content.

S410: The base station 101 sends first indication information to the terminal device 102, where the first indication information indicates M time domain resources of a first uplink carrier.

Optionally, before S410, the first indication information may be determined by the base station 101 from N time domain resources included in the first uplink carrier. To be specific, the base station 101 determines the M time domain resources in which the terminal device 102 performs supplementary uplink SUL transmission, and notifies the terminal device 102 of the M time domain resources by using the first indication information.

Specifically, the first uplink carrier supports supplementary uplink SUL transmission, the first uplink carrier includes the N time domain resources, the N time domain resources include an uplink resource and/or a flexible time domain resource, the time domain resource includes a slot and/or a symbol, and M<N.

Optionally, in this embodiment of this application, a case in which M=N may be further included. It should be understood that a dedicated SUL carrier is set in the conventional technology, and all uplink resources of the SUL carrier are used for uplink transmission. According to the method provided in this embodiment of this application, all or some time domain resources of the SUL carrier may be configured to send an uplink signal/uplink channel. Alternatively, in a period of time, all time domain resources of the SUL carrier are configured for uplink transmission. Compared with a case in which all time domain resources of the SUL carrier are used for uplink transmission at any time, this configuration manner is more flexible, and resource utilization is higher.

S420: The terminal device 102 determines, from the N time domain resources included in the first uplink carrier based on the first indication information, the M time domain resources used for supplementary uplink SUL transmission.

The base station 101 sends the first indication information to the terminal device 102 according to the plurality of methods described in S420, and the terminal device 102 may configure the M available time domain resources for the SUL carrier based on the first indication information.

S430: The terminal device 102 sends a first uplink signal and/or an uplink channel to the base station 101 by using the M time domain resources of the first uplink carrier. Correspondingly, the base station 101 receives, by using the M time domain resources of the first uplink carrier, the first uplink signal and/or the uplink channel sent by the terminal device 102.

It should be understood that, in this embodiment of this application, the first uplink carrier may also be referred to as an "SUL carrier", and the system may include one or more first uplink carriers, in other words, include one or more SUL carriers. In this embodiment of this application, one SUL carrier is used as an example to describe a method for configuring an available resource for the SUL carrier. A quantity of SUL carriers (first uplink carriers) is not limited in this embodiment of this application.

It should be further understood that, in this embodiment of this application, a band in which the first uplink carrier is located is a TDD band, and the band in which the first uplink carrier is located further includes another resource used for downlink transmission. In other words, the one or more SUL carriers in this embodiment of this application multiplex an existing LTE TDD band or a low-frequency FDD band deployed for NR, and the one or more SUL carriers are different from the dedicated SUL carrier configured in the conventional technology. Specifically, any resource in the dedicated SUL carrier configured in the conventional technology may be used for uplink transmission, that is, sending a PUCCH/PUSCH.

In a possible scenario, the base station 101 may provide carriers for a plurality of terminal devices. For example, the base station 101 may provide an NR carrier for a first terminal device, used for uplink transmission and downlink transmission (NUL and NDL) of the terminal device. In addition, the base station 101 may further provide an LTE carrier for a second terminal device, used for uplink transmission and downlink transmission (NUL and NDL) of the second terminal device. Optionally, a frequency channel number of a band in which the NR carrier of the first terminal device is located may be higher than a frequency channel number of a band in which the LTE carrier of the second terminal device is located. In this scenario, with reference to this embodiment of this application, the SUL carrier of the first terminal device may multiplex an LTE carrier of a lower frequency band of the second terminal device.

Alternatively, in another possible scenario, both the first terminal device and the second terminal device may be terminal devices operating in NR, and the base station 101 provides an NR carrier for each of the first terminal device and the second terminal device. Optionally, a frequency band range of a frequency band in which the NR carrier of the first terminal device is located may be different from a frequency band range of a frequency band in which the NR carrier of the second terminal device is located. In this scenario, with reference to this embodiment of this application, the SUL carrier of the first terminal device may multiplex an NR carrier of a lower frequency band of the second terminal device, or the SUL carrier of the second terminal device may multiplex an NR carrier of a lower frequency band of the first terminal device. It should be understood that an available scenario is not limited in this embodiment of this application.

Optionally, a band in which an SUL carrier is located may multiplex an LTE TDD band or a low-frequency FDD band for NR deployment. Specifically, the base station 101 may configure an available SUL carrier for the terminal device 102, predefine an associated SUL carrier for an NDL/NUL band of the terminal device 102, or the like. The manner is described in detail in another related patent application, and details are not described in this embodiment of this application.

It should be further understood that, in this embodiment of this application, the first uplink carrier that supports supplementary uplink SUL transmission may include the N time domain resources, and the time domain resource may be specifically a "slot (time slot)" and/or a "time domain symbol (symbol)" described above.

Optionally, the N time domain resources of the first uplink carrier may include one or more of a time domain resource configured for uplink transmission (marked as "U"), a flexible time domain resource (flexible, marked as "F"), and a disabled time domain resource (marked as "D").

According to the method provided in this embodiment of this application, slots and/or symbols used for sending an uplink signal and/or an uplink channel on one or more SUL carriers may be configured, or a quantity of slots or symbols used for sending the first uplink signal and/or the uplink channel on an SUL carrier may be configured. This is not limited in this embodiment of this application.

It is assumed that a symbol is used as a unit of a time domain resource. For one SUL carrier, assuming that the SUL carrier includes N symbols, the base station 101 may determine, from the N symbols, M symbols for the terminal device 102 to send the first uplink signal and/or the uplink channel. In this process, the base station 101 may determine locations of the M symbols and/or the quantity M of symbols, and notify the terminal device 102 of the locations of the M symbols and/or the quantity M of symbols.

In a possible implementation, the base station 101 may notify the terminal device 102 of only information about the M time domain resources by using the first indication information, for example, information such as locations and a quantity of the M time domain resources. The terminal device 102 may determine, by using the information about the locations and the quantity of the M time domain resources that are indicated by the first indication information, a time domain resource used for sending the first uplink signal and/or the uplink channel.

Optionally, the M time domain resources are time domain resources configured as "U", that is, the first indication information is used to configure an uplink resource of the SUL carrier.

In another possible implementation, when the N time domain resources include a flexible time domain resource, the first indication information further indicates K flexible time domain resources. The flexible time domain resource is used for SUL transmission or downlink transmission, and K<N. A process of S430 may be specifically as follows: The terminal device 102 sends the first uplink signal and/or the uplink channel to the base station 101 by using the M time domain resources and the K flexible time domain resources of the first uplink carrier. Correspondingly, the base station 101 receives the first uplink signal and/or the uplink channel by using the M time domain resources and the K flexible time domain resources of the first uplink carrier.

It should be understood that the flexible time domain resource may be further configured for uplink transmission or downlink transmission. In other words, a resource marked as "F" may be further configured as "U" or "D". When the N time domain resources include a flexible time domain resource, in addition to notifying the terminal device 102 of information about the time domain resource used for uplink transmission (marked as "U"), the base station 101 may further notify the terminal device 102 of information about the flexible time domain resource (marked as "F"). The time domain resources configured as U and F are resources that can be used for SUL transmission.

In still another possible implementation, a slot and/or a symbol used by the first uplink carrier are/is configured as a subset of uplink slots and/or symbols and flexible slots and/or symbols to which the band in which the first uplink carrier is located belongs; or a slot and/or a symbol used by the first uplink carrier are/is configured as a subset of uplink slots and/or symbols or flexible slots and/or symbols to which the band in which the first uplink carrier is located belongs.

For example, the base station 101 notifies, by using the first indication information, the terminal device 102 that configuration of the time domain resource of the SUL carrier may be determined based on a subset of a configuration set of the uplink slots and/or flexible slots of the band in which the SUL carrier is located.

It should be understood that the "subset" herein may include slots in which the SUL carrier is configured based on a same quantity of uplink slots and/or flexible slots, or symbols in which the SUL carrier is configured based on a same quantity of uplink symbols and/or flexible symbols, or slots in which the SUL carrier is configured based on a quantity less than a quantity of uplink slots and/or a quantity of flexible slots included in the band in which the SUL carrier is located, or symbols in which the SUL carrier is configured based on a quantity less than a quantity of uplink symbols and/or a quantity of flexible symbols included in the band in which the SUL carrier is located. This is not limited in this embodiment of this application.

Optionally, the base station 101 may send the first indication information to the terminal device 102 in different manners. In other words, the first indication information may be carried in different messages. For example, the first indication information may be carried in a system information block (system information block, SIB), or the first indication information is carried in downlink control information DCI, or the first indication information is carried in radio resource control (radio resource control, RRC) dedicated signaling.

The following specifically describes three possible implementations of the first indication information in S410.

Manner 1

In a possible implementation, the base station 101 may send the first indication information to the terminal device 102 by using a system information block SIB, and configure the M time domain resources for one or more first uplink carriers by using the first indication information.

Optionally, when the N time domain resources include a flexible time domain resource, the SIB further indicates K flexible time domain resources. In this case, the terminal device 102 may send the first uplink signal and/or the uplink channel to the base station 101 by using the M time domain resources and the K flexible time domain resources of the first uplink carrier. Correspondingly, the base station 101 receives the first uplink signal and/or the uplink channel by using the M time domain resources and the K flexible time domain resources of the first uplink carrier.

Optionally, the SIB may include a plurality of configuration parameters, and the configuration parameter may include a reference subcarrier spacing (sub carrier spacing, SCS) and at least one configuration pattern (pattern) of the first uplink carrier. Further, the configuration pattern (pattern) may include a configuration cycle in the configuration pattern. The terminal device 102 may obtain the information about the M time domain resources, that is, available uplink resources, based on the at least one configuration pattern and the configuration cycle in the configuration pattern.

Optionally, the at least one configuration pattern (pattern) may include a single configuration pattern, a dual configuration pattern, and the like. A configuration format of a cycle and a configuration format of a time domain resource in each pattern in the single configuration pattern are the same, and a configuration format of a cycle and a configuration format of a time domain resource in each pattern in the dual configuration pattern may be different.

Figure 5:
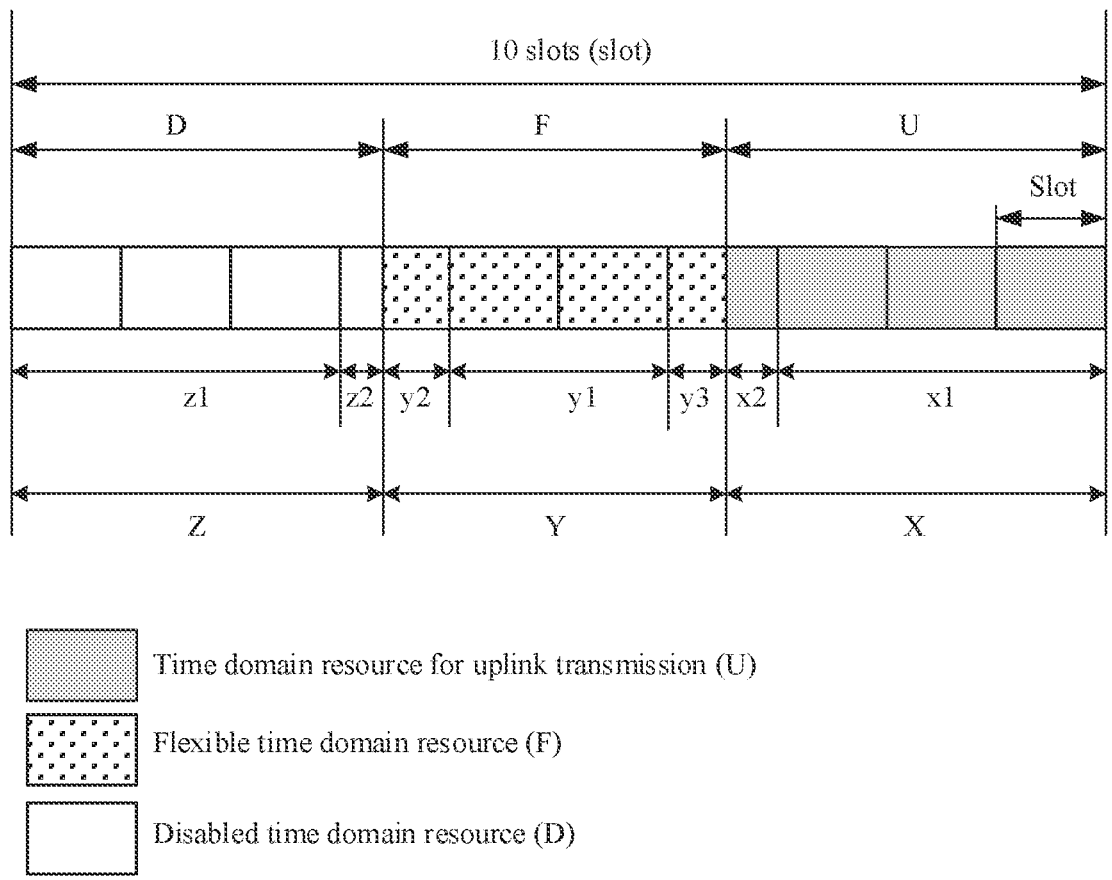
FIG. 5 is a schematic diagram of a time domain resource configuration in a single configuration pattern according to an embodiment of this application.

FIG. 5 is a schematic diagram of a time domain resource configuration in a single configuration pattern according to an embodiment of this application. For example, as shown in FIG. 5, U represents a slot and/or a symbol that are/is configured as an uplink resource, F represents a slot and/or a symbol that are/is configured as a flexible time domain resource, and D represents a slot and/or a symbol that are/is configured as a disabled time domain resource. Optionally, the disabled time domain resource may be a time domain resource configured for downlink transmission. This is not limited in this embodiment of this application.

For a time domain resource in the single configuration pattern, in a process in which the base station 101 indicates a configuration parameter of the first uplink carrier by using the first indication information in one cycle, the first indication information may include a configuration parameter in at least one of the following cases.

(1) Configure a slot and/or a symbol of an uplink resource. A quantity of slots and/or a quantity of symbols are/is used as an example. A quantity x1 of slots and/or a quantity x2 of symbols of the uplink resource marked as U in FIG. 5 are/is configured.

(2) Configure a symbol of an uplink resource. A quantity of symbols is used as an example. A quantity X of symbols of the uplink resource marked as U in FIG. 5 is configured.

(3) Configure slots and/or symbols of an uplink resource and a flexible time domain resource. A quantity of slots and/or a quantity of symbols are/is used as an example. A quantity x1 of slots and/or a quantity x2 of symbols of the uplink resource marked as U in FIG. 5 and a quantity y1 of slots and/or a quantity y2+y3 of symbols of a flexible time domain resource marked as F in FIG. 5 are configured.

(4) Configure symbols of an uplink resource and a flexible time domain resource. A quantity of symbols is used as an example. A quantity X of symbols of the uplink resource marked as U in FIG. 5 and a quantity Y of symbols of the flexible time domain resource marked as F in FIG. 5 are configured.

(5) Configure slots and/or symbols of an uplink resource and a disabled time domain resource. A quantity of slots and/or a quantity of symbols are/is used as an example. A quantity x1 of slots and/or a quantity x2 of symbols of the uplink resource marked as U in FIG. 5 and a quantity z1 of slots and/or a quantity $K_1/K_{min}+K_2/K_{min}+\ldots+K_n/K_{min}+K_{n+1}/K_{min}=z2$ of symbols of the disabled time domain resource marked as D in FIG. 5 are configured, and remaining slots and/or symbols in the cycle are configured as flexible time domain resources.

(6) Configure symbols of an uplink resource and a disabled time domain resource. A quantity of symbols is used as an example. A quantity X of symbols of the uplink resource marked as U in FIG. 5 and a quantity Z of symbols of the disabled time domain resource marked as D in FIG. 5 are configured, and remaining symbols in the cycle are configured as flexible time domain resources.

(7) Configure slots and/or symbols of an uplink resource, a flexible time domain resource, and a disabled time domain resource. A quantity of slots and/or a quantity of symbols are/is used as an example. A quantity x1 of slots and/or a quantity x2 of symbols of the uplink resource marked as U in FIG. 5, a quantity y1 of slots and/or a quantity y2+y3 of symbols of the flexible time domain resource marked as F in FIG. 5, and a quantity z1 of slots and/or a quantity z2 of symbols of the disabled time domain resource marked as D in FIG. 5 are configured.

(8) Configure symbols of an uplink resource, a flexible time domain resource, and a disabled time domain resource. A quantity of symbols is used as an example. A quantity X of symbols of the uplink resource marked as U in FIG. 5, a quantity Y of symbols of a flexible time domain resource marked as F in FIG. 5, and a quantity Z of symbols of the disabled time domain resource marked as D in FIG. 5 are configured.

It should be understood that the base station 101 may select any possible manner to configure the first uplink carrier for the terminal device 102, so that the terminal device 102 can determine, based on the first indication information, slots and/or symbols of the M time domain resources used for SUL transmission.

It should be further understood that in the foregoing plurality of possible manners, signaling overheads can be reduced because of less configuration information included in the first indication information. For example, compared with the configuration manner (8), less configuration parameter information is involved in the configuration manner (1). This reduces signaling overheads.

In a possible implementation, after the base station 101 notifies, by using the first indication information, the terminal device 102 of the M time domain resources and the K flexible time domain resources used for SUL transmission, the terminal device 102 may sequentially configure a time domain resource of "U" and a time domain resource of "F" in a back-to-front configuration order in one pattern, determine the time domain resource of "F" and the time domain resource of "U" as time domain resources available for SUL transmission, and determine a remaining time domain resource in the pattern as a disabled time domain resource.

The foregoing listed configuration case (8) is used as an example. As shown in FIG. 5, from back to front in one pattern, the terminal device 102 first configures X symbols as uplink resources, marks the X symbols as "U", configures Y symbols as flexible time domain resources, marks the Y symbols as "F", configures Z symbols as disabled time domain resources, marks the Z symbols as "D", and determines the time domain resources of "F" and the time domain resources of "U" as time domain resources used for SUL transmission. Similarly, in a subsequent time domain resource configuration process, configuration may be performed according to this implementation, or configuration is performed in a front-to-back manner in each pattern. This is not limited in this embodiment of this application.

It should be understood that, for the dual configuration pattern and the like, each pattern may be configured according to the single configuration pattern described above, and details are not described herein again.

In a possible implementation, for a plurality of SUL carriers, the SIB may include a common configuration parameter. In other words, only parameters different from the common configuration parameter are configured for the plurality of SUL carriers, to reduce signaling overheads.

Figure 6:
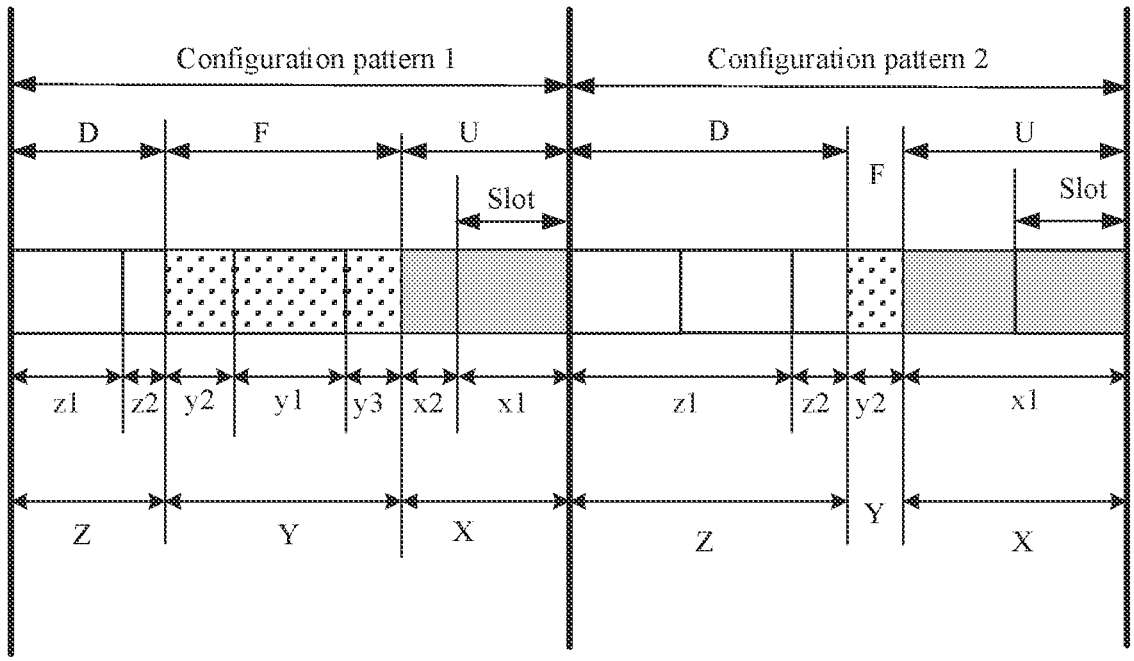
FIG. 6 is a schematic diagram of a time domain resource configuration in a dual configuration pattern according to an embodiment of this application.
Figure 6:
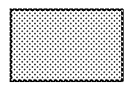
Figure 6:
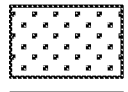
Figure 6:
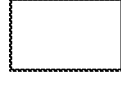

FIG. 6 is a schematic diagram of a time domain resource configuration in a dual configuration pattern according to an embodiment of this application. For example, as shown in FIG. 6, configuration parameters in two patterns are included, and the configuration parameters in the two patterns are different. For example, quantities of symbols included in X, Y, and Z in a configuration pattern 1 are partially or completely different.

In this implementation, the first indication information may indicate a configuration parameter of a time domain resource in one cycle in the configuration pattern 1, and may also indicate a configuration parameter of a time domain resource in one cycle in a configuration pattern 2. For a time domain resource in the dual configuration pattern, the configuration pattern 1 and the configuration pattern 2 are cyclically performed in sequence to complete a time domain resource configuration of the first uplink carrier. Details are not described herein.

According to the method provided in Manner 1, the base station 101 may semi-statically configure available time domain resources for one or more SUL carriers by using the SIB. After receiving the SIB, the terminal device 102 determines, based on the configuration information (the first indication information) in the SIB, a time domain resource that is configured as U and/or F as a time domain resource used for uplink transmission, and determines another time domain resource as a disabled time domain resource.

According to the foregoing solution, in this embodiment of this application, time domain resources available to one or more SUL carriers may be configured. When the band in which the SUL carrier is located multiplexes a TDD band or a low-frequency FDD band, some time domain resources of the SUL carrier may support some downlink transmission. According to this embodiment of this application, an available time domain resource used for uplink transmission is configured for the SUL carrier, so that SUL transmission is not affected by a service, for example, downlink transmission of the SUL carrier. This improves transmission reliability and further improves an uplink transmission capacity. In addition, some time domain resources of the one or more SUL carriers may be configured as dynamic or semi-static time domain resources for another service to use, so that resource utilization can be improved.

In another possible implementation, when the base station 101 sends the first indication information to the terminal device 102 by using the SIB described in Manner 1, and configures, by using the SIB, that the N time domain resources of the first uplink carrier include the K flexible time domain resources, after S410 to S420, the method may further include the following steps.

S440: The base station 101 sends second indication information to the terminal device 102, where the second indication information indicates L time domain resources that are in the K flexible time domain resources and that are used for SUL transmission, the L time domain resources include L0 uplink resources and L1 flexible time domain resources, and 0≤L≤K.

S420-1: The terminal device 102 determines, from the K flexible time domain resources based on the second indication information, the L time domain resources used for SUL transmission.

It should be understood that the L time domain resources herein may include the L0 uplink resources and the L1 flexible time domain resources. In other words, the L time domain resources herein may include L0 resources configured as "U" and L1 flexible time domain resources configured as "F".

S430-1: The terminal device 102 sends the first uplink signal and/or the uplink channel to the base station 101 by using the M time domain resources and the L time domain resources. Correspondingly, the base station 101 receives, by using the M time domain resources and the L time domain resources of the first uplink carrier, the first uplink signal and/or the uplink channel sent by the terminal device 102.

It should be understood that after configuring the M+K time domain resources of the one or more SUL carriers for the terminal device 102 by using S410 to S420, the base station 101 may further modify the configured time domain resources of the one or more SUL carriers based on different scenarios and requirements, that is, modify a configuration of flexible time domain resources by using the second indication information provided in this embodiment of this application.

It should be further understood that when the configuration of flexible time domain resources is modified by using the second indication information, S420-1 and S430-1 may be understood as a specific implementation form of S420 and S430. In other words, S420-1 and S430-1 may replace S420 and S430, to determine a time domain resource used to send the first uplink signal/channel. This is not limited in this embodiment of this application.

It should be further understood that S440, S420-1, and S430-1 are optional steps in this embodiment of this application, and therefore are shown in dashed boxes in the method 400 in FIG. 4A and FIG. 4B.

It should be understood that a configuration cycle of the SUL carrier may be the same as a semi-static configuration cycle of the SIB described in Manner 1. When the time domain resource of the SUL carrier is further configured by using first RRC dedicated signaling, a configuration parameter of the first RRC dedicated signaling may overwrite the original flexible time domain resource (F) configured by using the SIB in the Manner 1, and after configuration of the first RRC dedicated signaling is accepted, the SUL carrier changes in each cycle based on the configuration parameter of the first RRC dedicated signaling. Optionally, when the first indication information is sent by using the SIB, the second indication information may be implemented in the following two manners.

1. Implementation 1

Optionally, when the first indication information is sent by using the SIB, the second indication information may be carried in the first radio resource control RRC dedicated signaling.

Specifically, the configuration of flexible time domain resources of the SUL carrier may be further modified in any one of the following possible manners by using the first RRC dedicated signaling: for example, (1) configuring some slots of the SUL carrier as time domain resources used for uplink transmission, that is, marking the slots as U;

(2) configuring all symbols included in a slot of the SUL carrier as time domain resources used for uplink transmission, that is, marking all the symbols in the slot as U; and (3) configuring a quantity of flexible symbols (nrofFlexibleSymbols) and/or a quantity of symbols used for uplink transmission (nrofUplinkSymbols) in a slot.

Specifically, the first RRC dedicated signaling may be embodied in the following form:

```
TDD- SUL- Config Dedicated::=   SEQUENCE{
slotSpecificConfigurationsToAddModlist
SEQUENCE(size(1...maxNrofslots))OFSUL-slotConfig
slotSpecificConfigurationsToReleaselist
SEQUENCE(size(1...maxNrofslots))OFSUL-slotConfig
}
```

```
SUL-slotConfig::= SEQUENCE{
slotIndex            SUL-slotIndex
symbols              CHOICE{
  allUplink            NULL,
  explicit             SEQUENCE{
    nrofFlexibleSymbols INTEDER(1...maxNrofUplinkSymbols-1)
    nrofUplinkSymbols INTEDER(1...maxNrofUplinkSymbols-1)}
  }
}
```

It should be understood that, in the foregoing implementation, the second indication information is sent to the terminal device 102 by using the first RRC dedicated signaling, to further modify the original flexible time domain resource F configured in the SIB. For example, the K flexible time domain resources are configured by using the first indication information, and the L flexible time domain resources of the K flexible time domain resources may be reconfigured, by using the second indication information, as uplink resources used for SUL transmission. The L time domain resources include the L0 uplink resources and the L1 flexible time domain resources, and 0≤L≤K.

Further, for Implementation 1, the base station 101 first sends the first indication information to the terminal device 102 by using the SIB, to configure the time domain resources of the one or more SUL carriers, then sends the second indication information to the terminal device 102 by using the first RRC dedicated signaling, to modify the flexible time domain resources of the one or more SUL carriers, and may further modify the configured flexible time domain resources of the one or more SUL carriers by using third indication information provided in this embodiment of this application. In other words, when the base station 101 sends the first indication information to the terminal device 102 by using the SIB described in Manner 1, and configures, by using the second indication information of the first RRC dedicated signaling, that the M time domain resources and the L time domain resources of the first uplink carrier can be used for SUL transmission, after S410, S420, S440, and S420-1, this embodiment of this application may further include the following steps.

S450: The base station 101 sends the third indication information to the terminal device 102, where the third indication information indicates S time domain resources that are in the L1 flexible time domain resources and that are used for uplink transmission, and 0≤S≤L1.

S420-2: The terminal device 102 determines, from the L1 flexible time domain resources based on the third indication information, the S time domain resources used for SUL transmission.

It should be understood that the S time domain resources herein may include S0 uplink resources and S1 flexible time domain resources. In other words, the S time domain resources herein may include S0 resources configured as "U" and S1 flexible time domain resources configured as "F".

It should be further understood that the base station 101 may further modify the configured L1 flexible time domain resources of the one or more SUL carriers based on different scenarios and requirements, that is, modify the configuration of flexible time domain resources by using the third indication information provided in this embodiment of this application.

S430-2: The terminal device 102 sends the first uplink signal and/or the uplink channel to the base station 101 by using the M time domain resources, the L0 uplink resources, and the S time domain resources. Correspondingly, the base station 101 receives, by using the M time domain resources, the L0 uplink resources, and the S time domain resources of the first uplink carrier, the first uplink signal and/or the uplink channel sent by the terminal device 102.

It should be understood that when the configuration of flexible time domain resources is further modified by using the third indication information, S420-2 and S430-2 may be understood as a specific implementation form of S420 and S430, or S420-2, S430-2, S420-1, and S430-1 may replace implementation processes of S420 and S430, to determine a time domain resource used to send the first uplink signal/channel. This is not limited in this embodiment of this application.

It should be further understood that S450, S420-2, and S430-2 are optional steps in this embodiment of this application, and therefore are shown in dashed boxes in the method 400 in FIG. 4A and FIG. 4B.

Optionally, the third indication information may be carried in downlink control information DCI or a media access control element (media access control element, MAC CE), and the DCI indicates one or more first uplink carriers used for SUL transmission.

Optionally, in the DCI or the MAC CE, a specified slot and/or symbol on the SUL carrier may further be configured as a time domain resource in which the first uplink signal/channel may be sent. For example, the DCI or the MAC CE may include the third indication information, to re-indicate a configuration status of the flexible time domain resources of the SUL carrier in a time period.

For example, when the third indication information is carried in the DCI or the MAC CE, to configure time domain resources within specific duration (for example, 10 ms), a moment at which the terminal device 102 receives the third indication information is a start moment, the SUL carrier is reconfigured according to a time domain resource configuration rule indicated by the third indication information within 10 ms since the terminal device 102 receives the third indication information, until new DCI or a new MAC CE is received.

In a time period other than 10 ms, for example, 11 ms to 15 ms, the time domain resource of the SUL carrier is configured according to an original configuration rule of the first indication information and/or the second indication information; or if no time domain resource of the SUL carrier is configured for the first indication information and/or the second indication information previously, all the time domain resources of the SUL carrier may be configured as uplink resources. Details about a DCI configuration rule are not described in subsequent embodiments.

In addition, if the one or more SUL carriers and an NUL in a same cell as the one or more SUL carriers include at least two different types of subcarrier spacings, when the DCI or the MAC CE indicates a set of slot format combinations that is used to configure n SUL carriers, the n SUL carriers may be configured in different manners.

In a possible configuration manner, it is assumed that n+1 uplink carriers of the terminal device include n SUL carriers and one NUL carrier. Reference subcarrier spacings SCSs of the n+1 uplink carriers are respectively denoted as $K_1$, $K_2$, ..., $K_n$, and $K_{n+1}$, where $K_{min}$ is a minimum reference subcarrier spacing of the uplink carriers of the terminal device. Ratios between the reference subcarrier spacings of the uplink carriers and the minimum reference subcarrier spacing is denoted as $K_1/K_{min}$, $K_2/K_{min}$, ..., $K_n/K_{min}$, and $K_{n+1}/K_{min}$.

The DCI or the MAC CE may indicate the set of slot format combinations (SlotFormatCombination). The set of slot format combinations may be predefined by RRC, each slot format combination in the set of slot format combinations may include m preconfigured single slot format indexes, and m may be determined according to the following formula:

$$K_1/K_{min}+K_2/K_{min}+ \ldots +K_n/K_{min}+K_{n+1}/K_{min}=m \quad \text{Formula (1)}$$

In other words, time domain resources are configured for the n+1 uplink carriers of the terminal device by using the m preconfigured single slot format indexes included in each slot format combination in the set of slot format combinations that is indicated by the DCI or the MAC CE.

Figure 7:
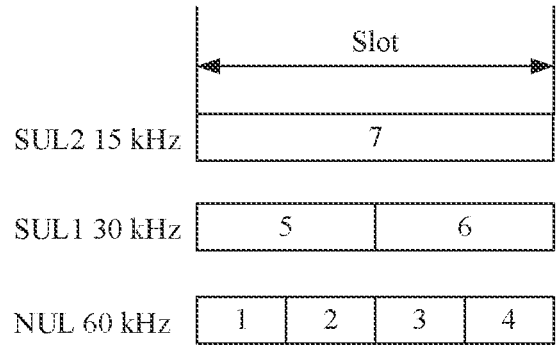
FIG. 7 is a schematic diagram of another time domain resource configuration according to an embodiment of this application.

FIG. 7 is a schematic diagram of still another time domain resource configuration according to an embodiment of this application. For example, as shown in FIG. 7, one NUL carrier and two SUL carriers of the terminal device are used as an example. A reference subcarrier spacing corresponding to one NUL carrier is 60 kHz, and reference subcarrier spacings corresponding to two SUL carriers are 30 kHz and 15 kHz respectively. A slot of an SUL carrier with the minimum reference subcarrier spacing is used as a unit cycle, and the unit cycle may correspond to four slot configurations of an NUL carrier and two slot configurations of an SUL 1. Specifically, m may be obtained through calculation according to the foregoing formula (1).

Herein, $m=K_1$, $K_{min}+K_2/K_{min}+ \ldots +K_n$, $K_{min}+K_{n+1}/K_{min}=30/15+60/15+15/15=2+4+1=7$.

Therefore, each slot format combination indicated in the DCI or the MAC CE includes seven preconfigured single slot format indexes, and time domain resources are configured for three uplink carriers of the terminal device in a unit cycle.

Optionally, in a possible implementation, the single slot format index may multiplex a single slot format configured for a TDD band in which the SUL carrier is located, and the terminal device may ignore configuration of a downlink symbol (D) in the single slot format.

Alternatively, the single slot format index is determined according to a preset rule; or a predefined first slot format, indicating the time domain resource used for SUL transmission; or a predefined second slot format, indicating the time domain resource used for SUL transmission and the flexible time domain resource.

For example. FIG. 8 is a schematic diagram of yet another time domain resource configuration according to an embodiment of this application. For example, as shown in (a) in FIG. 8, the single slot format index multiplexes a slot configuration table in an existing standard, or as shown in (b) in FIG. 8, the single slot format index is a slot configuration table newly defined in a standard. This is not limited in this embodiment of this application.

It should be understood that, regardless of whether the slot configuration table in the existing standard is multiplexed or the slot configuration table newly defined in the standard is multiplexed, each slot format combination includes seven preconfigured single slot format indexes. For example, a slot format combination {10, 11, 1, 1, 1, 2, 10} indicates that a slot 1, a slot 2, a slot 3, and a slot 4 of the 60 kHz NUL in FIG. 7 are configured according to 10, 11, 1, and 1. That is, the slot 1 is configured according to 14 symbols of a table row number 10 defined in (a) in FIG. 8, and similarly, the slot 3 and the slot 4 are configured according to 14 symbols of a table row number 1 defined in (b) in FIG. 8. Details are not described herein.

2. Implementation 2

Optionally, when the first indication information is sent by using the SIB, the second indication information may be further carried in downlink control information DCI or a MAC CE.

Specifically, in the foregoing implementation, the second indication information is sent to the terminal device 102 by using the DCI or the MAC CE, to further modify the original flexible time domain resource F configured in the SIB. For example, the K flexible time domain resources are configured by using the first indication information, and the L flexible time domain resources of the K flexible time domain resources may be reconfigured, by using the second indication information, as uplink resources used for SUL transmission, where $0 \leq L \leq K$.

In Implementation 2, a process in which the base station 101 modifies the time domain resource of the SUL carrier again by using the third indication information may be not performed. In other words, processes of S450, S420-2, and S430-2 described above are not performed.

When the time domain resource of the SUL carrier is further configured by using the DCI or the MAC CE, a configuration parameter of the DCI or the MAC CE may overwrite the original flexible time domain resource (F) configured in Manner 1. For a specific process of modifying the time domain resource of the SUL carrier by using the DCI or the MAC CE, refer to the foregoing descriptions and the processes in FIG. 7 and FIG. 8. Details are not described herein again.

Manner 2

In another possible implementation, the base station 101 may send the first indication information to the terminal device 102 by using second RRC dedicated signaling, and configure the M time domain resources for the one or more first uplink carriers by using the first indication information.

Optionally, when the N time domain resources include a flexible time domain resource, the second RRC dedicated signaling further indicates K flexible time domain resources. In this case, the terminal device 102 may send the first uplink signal and/or the uplink channel to the base station 101 by using the M time domain resources and the K flexible time domain resources of the first uplink carrier. Correspondingly, the base station 101 receives the first uplink signal and/or the uplink channel by using the M time domain resources and the K flexible time domain resources of the first uplink carrier. Optionally, in the second RRC dedicated signaling, a specified slot and/or symbol on the SUL carrier may be configured as a time domain resource in which the first uplink signal/channel may be sent. For example, the first indication information included in the second RRC dedicated signaling may be used to configure the SUL carrier in any one of the eight configuration manners described in Manner 1. Details are not described herein again. For details, refer to the specific descriptions in Manner 1.

Specifically, the base station 101 may alternatively configure the time domain resource of the SUL carrier for the terminal device 102 by using the second RRC dedicated signaling and selecting the eight possible manners described in Manner 1, so that the terminal device 102 can determine, based on the second RRC dedicated signaling, the M time domain resources or slots and/or symbols of the M+K time domain resources used for SUL transmission, to implement a configuration effect the same as that of the SIB in Manner 1.

It should be further understood that the second RRC dedicated signaling herein is different from the first RRC dedicated signaling in Manner 1, and the first RRC dedicated signaling is a possible implementation of the second indication information. Therefore, the first RRC dedicated signaling and the second RRC dedicated signaling are merely used to distinguish between RRC dedicated signaling for implementing different purposes in different scenarios. In a specific implementation process, a format, content, and the like of the RRC dedicated signaling are not limited.

In a possible implementation, for a plurality of SUL carriers, the second RRC dedicated signaling may include a common configuration parameter. In other words, only parameters different from the common configuration parameter are configured for the plurality of SUL carriers, to reduce signaling overheads.

In still another possible implementation, when the base station 101 sends the first indication information to the terminal device 102 by using the second RRC dedicated signaling described in Manner 2, and configures, by using the second RRC dedicated signaling, that the N time domain resources of the first uplink carrier include the K flexible time domain resources, after S410 to S420, processes of S440, S420-1, and S430-1 in FIG. 4A and FIG. 4B may be further included. Details are not described herein again.

It should be understood that after configuring the time domain resources of the one or more SUL carriers for the terminal device 102 by using S410 to S420, the base station 101 may further modify the configured flexible time domain resources of the one or more SUL carriers based on different scenarios and requirements, that is, modify the flexible time domain resources by using the second indication information provided in this embodiment of this application. When the first indication information is sent by using the second RRC dedicated signaling, the second indication information may be implemented in the following two manners.

1. Implementation 1

Optionally, when the first indication information is sent by using the second RRC dedicated signaling, the second indication information may be carried in first radio resource control RRC dedicated signaling. For a specific process of further modifying original configuration of the SUL carrier by using the first RRC dedicated signaling, refer to the related descriptions in Implementation 1 of Manner 1. Details are not described herein again.

Specifically, in the foregoing implementation, the second indication information is sent to the terminal device 102 by using the first RRC dedicated signaling, to further modify an original flexible time domain resource F configured in the second RRC dedicated signaling. For example, the K flexible time domain resources are configured by using the first indication information, and L flexible time domain resources in the K flexible time domain resources may be reconfigured, by using the second indication information, as uplink resources used for SUL transmission. The L time domain resources include L0 uplink resources and L1 flexible time domain resources, and $0 \le L \le K$.

Further, for Implementation 1, the base station 101 first sends the first indication information to the terminal device 102 by using the second RRC dedicated signaling, and then sends the second indication information to the terminal device 102 by using the first RRC dedicated signaling. After configuring the time domain resources of the one or more SUL carriers, the base station 101 may further modify the configured flexible time domain resources of the one or more SUL carriers, that is, modify the L1 flexible time domain resources by using third indication information provided in this embodiment of this application. In other words, after S440, S420-1, and S430-1, processes of S450, S420-2, and S430-2 in FIG. 4A and FIG. 4B may be further included. Details are not described herein again.

Optionally, the third indication information may be carried in DCI or a MAC CE, and the DCI indicates one or more first uplink carriers used for SUL transmission. For a specific process of further modifying the original configuration of the SUL carrier by using the third indication information included in the DCI or the MAC CE, refer to the related descriptions in Implementation 1 of Manner 1. Details are not described herein again.

2. Implementation 2

Optionally, when the first indication information is sent by using the second RRC dedicated signaling, the second indication information may be further carried in DCI or a MAC CE.

Specifically, in the foregoing implementation, the second indication information is sent to the terminal device 102 by using the DCI or the MAC CE, to further modify an original flexible time domain resource F configured in the second RRC dedicated signaling. For example, the K flexible time domain resources are configured by using the first indication information, and L time domain resources in the K flexible time domain resources may be reconfigured by using the second indication information as L0 uplink resources and L1 flexible time domain resources used for SUL transmission, where $0 \le L \le K$.

In Implementation 2, a process in which the base station 101 modifies the time domain resource of the SUL carrier again by using the third indication information may be not performed. In other words, processes of S450, S420-2, and S430-2 described above are not performed. Details are not described herein again.

According to the foregoing solution, in this embodiment of this application, time domain resources available to the one or more SUL carriers may be configured. When the band in which the SUL carrier is located multiplexes a TDD band or a low-frequency FDD band, some time domain resources of the SUL carrier may support some downlink transmission. According to this embodiment of this application, an available time domain resource used for uplink transmission is configured for the SUL carrier, so that SUL transmission is not affected by a service, for example, downlink transmission of the SUL carrier. This improves transmission reliability and further improves an uplink transmission capacity. In addition, some time domain resources of the one or more SUL carriers may be configured as dynamic or semi-static time domain resources for another service to use, so that resource utilization can be improved.

Manner 3

In still another possible implementation, the base station 101 may dynamically send the first indication information to the terminal device 102 by using DCI or a MAC CE, and configure the M time domain resources for the one or more first uplink carriers by using the first indication information.

Optionally, when the N time domain resources include a flexible time domain resource, the DCI or the MAC CE further indicates K flexible time domain resources. In this case, the terminal device 102 may send the first uplink signal and/or the uplink channel to the base station 101 by using the M time domain resources and the K flexible time domain resources of the first uplink carrier. Correspondingly, the base station 101 receives the first uplink signal and/or the uplink channel by using the M time domain resources and the K flexible time domain resources of the first uplink carrier. Specifically, in the foregoing implementation, the first indication information is sent to the terminal device 102 by using the DCI or the MAC CE, to configure the time domain resource of the SUL carrier. For a specific process of further modifying the original configuration of the SUL carrier by using the first indication information included in the DCI or the MAC CE, refer to the related descriptions in Implementation 1 of Manner 1. Details are not described herein again.

It should be understood that in Manner 3, a process in which the base station 101 modifies L1 flexible time domain resources of the SUL carrier again by using the second indication information and third indication information may be not performed. In other words, processes of S440, S420-1, S430-1, S450, S420-2, and S430-2 described above are not performed.

According to the method provided in Manner 3, the base station 101 may dynamically configure available time domain resources for one or more SUL carriers by using the DCI or the MAC CE. After receiving the DCI or the MAC CE, the terminal device 102 determines, based on the configuration information (the first indication information) in the DCI or the MAC CE, a time domain resource that is configured as U and/or F as a time domain resource used for uplink transmission, and determines another time domain resource as a disabled time domain resource.

According to the foregoing solution, in this embodiment of this application, time domain resources available to the one or more SUL carriers may be configured. When the band in which the SUL carrier is located multiplexes a TDD band or a low-frequency FDD band, some time domain resources of the SUL carrier may support some downlink transmission. According to this embodiment of this application, an available time domain resource used for uplink transmission is configured for the SUL carrier, so that SUL transmission is not affected by a service, for example, downlink transmission of the SUL carrier. This improves transmission reliability and further improves an uplink transmission capacity. In addition, some time domain resources of the one or more SUL carriers may be configured as dynamic or semi-static time domain resources for another service to use, so that resource utilization can be improved.

Herein, it should be noted that in a process of configuring the time domain resource of the SUL carrier for the terminal device 102, the terminal device 102 uses the time domain resource of the SUL carrier according to the following rules.
 (1) The terminal device may perform SUL transmission, that is, send the first uplink signal/uplink channel to the base station, only in time domain resources configured as U and F.
 (2) If the terminal device does not receive any configuration information of the SUL carrier, the terminal device considers by default that all time domain resources of the SUL carrier are configured as U and all the time domain resources of the SUL carrier can be used for SUL transmission, that is, sends the first uplink signal/uplink channel to the base station.
 (3) A slot and/or a symbol that are/is of the SUL carrier and configured as F may be further dynamically modified. Optionally, the slot and/or the symbol of F may be modified by using the SIB, the RRC dedicated signaling, and the DCI, and priorities of modifying the slot and/or the symbol of F by using the foregoing three types of signaling are as follows:
 the priority of the SIB<the priority of the RRC dedicated signaling<the priority of the DCI/MAC CE.
 (4) If there is a multi-level modification, after the multi-level modification, the terminal device may perform SUL transmission, that is, send the first uplink signal/ uplink channel to the base station, in time domain resources that are finally configured as F and U. Another time domain resource cannot be used for SUL transmission.
 (5) The terminal device detects DCI related to uplink scheduling only in resources related to the time domain resources configured as F and U, to determine whether to send uplink signals/uplink channels such as a PUCCH, a PUSCH, a physical random access channel (physical random access channel, PRACH), and a sounding reference signal (sounding reference signal, SRS).
 (6) When the time domain resource of the SUL carrier is dynamically configured by using the DCI/MAC CE, the terminal device may ignore configuration of a disabled time domain resource "D" in the table, and apply only configuration solutions of the flexible time domain resource (F) and the uplink resource (U).

A method for determining a time domain resource for SUL transmission is agreed upon between the terminal device 102 and the base station 101 by using a related definition of a rule for using the time domain resource of the SUL carrier by the terminal device 102. This helps the base station and the terminal device reach a consensus on SUL transmission, to improve transmission reliability.

It should be further noted herein that when sending the first uplink signal/channel by using the time domain resource of the SUL carrier, the terminal device 102 may cancel use of some time domain resources according to specific rules. For example, when dynamically configuring the time domain resource of the SUL carrier as a non-uplink resource (D or F) by using the DCI or the MAC CE, the base station 101 may cancel sending of an uplink signal and/or an uplink channel in the time domain resource configured by using RRC dedicated signaling. The cancellation rules are as follows.
 (1) When sending of the uplink signal and/or the uplink channel meets an N2 time limitation requirement, sending of a PUCCH/PUSCH by using the time domain resource configured by using the RRC dedicated signaling may be canceled.
 (2) When the PUCCH/PUSCH configured by using the RRC dedicated signaling is repeatedly transmitted, repeated sending of the PUCCH/PUSCH in a conflict slot is canceled. FIG. 3 is used as an example. A PUCCH/PUSCH is repeatedly sent in the slot 1 to the slot 4, and the slot 2 is a conflict slot. In this case, only repeated sending of the PUCCH/PUSCH in the slot 2 may be canceled, and a cancellation unit is all symbols in the slot 2.
 (3) When the PUCCH/PUSCH configured by using the RRC dedicated signaling is not repeatedly sent, sending of the PUCCH/PUSCH on the entire SUL carrier is canceled. FIG. 3 is used as an example. It is configured that the PUCCH/PUSCH is sent in the slot 2, and the slot 2 is a conflict slot. In this case, sending of the PUCCH/PUSCH in all slots may be canceled.
 (4) For transmission of an SRS configured by using the RRC dedicated signaling, only sending of a PUCCH/PUSCH on a conflict symbol in a slot is canceled, and a cancellation unit is the conflict symbol in the slot.

According to the foregoing solution, in this embodiment of this application, the time domain resources available to the one or more SUL carriers may be configured. When the band in which the SUL carrier is located multiplexes the TDD band or the low-frequency FDD band, some time domain resources of the SUL carrier may support some downlink transmission. According to this embodiment of this application, the available time domain resource used for uplink transmission is configured for the SUL carrier, so that SUL transmission is not affected by a service, for example, downlink transmission of the SUL carrier. This improves transmission reliability and further improves the uplink transmission capacity. In addition, some time domain resources of the one or more SUL carriers may be configured as dynamic or semi-static time domain resources for another service to use, so that resource utilization can be improved. In addition, the foregoing embodiment further defines a rule for configuring the time domain resource of the SUL carrier for the terminal device and a rule for using the time domain resource of the SUL carrier by the terminal device. After the time domain resource of the SUL carrier is configured according to the foregoing method, the terminal device can perform SUL transmission in only the available uplink resource and cancel uplink transmission in the disabled resource according to the specific rules. This further ensures that SUL transmission is not affected by a service, for example, downlink transmission, and improves transmission reliability.

The foregoing describes in detail the resource determining methods in embodiments of this application with reference to FIG. 1 to FIG. 8. The following describes in detail resource determining apparatuses in embodiments of this application with reference to FIG. 9 to FIG. 12.

FIG. 9 is a schematic block diagram of a resource determining apparatus 900 according to an embodiment of this application. The apparatus 900 may correspond to the base station described in the method 400, or may be a chip or a component applied to the base station. In addition, modules or units in the apparatus 900 are separately configured to perform actions or processing processes performed by the base station in the method 400. As shown in FIG. 9, the communication apparatus 900 may include a sending unit 910 and a receiving unit 920.

The sending unit 910 is configured to send first indication information to a terminal device. The first indication information indicates M time domain resources of a first uplink carrier, the first uplink carrier supports supplementary uplink SUL transmission, the M time domain resources are time domain resources that are in N time domain resources included in the first uplink carrier and that are used for SUL transmission, the N time domain resources include an uplink resource and/or a flexible time domain resource, the time domain resource includes a slot and/or a symbol, and M<N.

The receiving unit 920 is configured to receive a first uplink signal and/or an uplink channel by using the M time domain resources of the first uplink carrier.

In a possible implementation, when the N time domain resources include a flexible resource, when the N time domain resources include a flexible time domain resource, the first indication information further indicates K flexible time domain resources. The flexible time domain resource is used for SUL transmission or downlink transmission, and K<N. The receiving unit 920 is further configured to receive the first uplink signal and/or the uplink channel by using the M time domain resources and the K flexible time domain resources of the first uplink carrier.

Optionally, the first indication information is carried in a system information block SIB; or the first indication information is carried in downlink control information DCI; or the first indication information is carried in radio resource control RRC dedicated signaling.

Optionally, a band in which the first uplink carrier is located further includes another resource for downlink transmission, and the band in which the first uplink carrier is located is a TDD band.

In another possible implementation, a slot and/or a symbol used by the first uplink carrier are/is configured as a subset of uplink slots and/or symbols and flexible slots and/or symbols to which the band in which the first uplink carrier is located belongs; or a slot and/or a symbol used by the first uplink carrier are/is configured as a subset of uplink slots and/or symbols or flexible slots and/or symbols to which the band in which the first uplink carrier is located belongs.

In still another possible implementation, when the N time domain resources include K flexible resources, the sending unit 910 is further configured to send second indication information to the user equipment. The second indication information indicates L flexible resources that are in the K flexible resources and that are used for SUL transmission, and 0≤L≤K. The L time domain resources include L0 uplink resources and L1 flexible time domain resources, and 0≤L≤K. The receiving unit 920 is further configured to receive the first uplink signal and/or the uplink channel by using the M time domain resources and the L time domain resources of the first uplink carrier.

Optionally, the second indication information is carried in radio resource control message RRC dedicated signaling; or the second indication information is carried in downlink control information DCI.

In yet another possible implementation, the sending unit 910 is further configured to send third indication information to user equipment. The third indication information indicates S time domain resources that are in the L1 flexible time domain resources and that are used for uplink transmission, and 0≤S≤L1. The receiving unit 920 is further configured to receive the first uplink signal and/or the uplink channel by using the M time domain resources, the L0 uplink resources, and the S time domain resources of the first uplink carrier.

Optionally, the third indication information is carried in downlink control information DCI, and the DCI indicates one or more first uplink carriers used for SUL transmission.

When n first uplink carriers are indicated by downlink control information DCI, the DCI specifically indicates a set of slot format combinations, the set of slot format combinations is used to configure the n first uplink carriers, each slot format combination in the set of slot format combinations includes m single slot format indexes, and m is determined according to the following formula:

$$K_1/K_{min}+K_2/K_{min}+\ldots+K_n/K_{min}+K_{n+1}/K_{min}=m,$$
where $K_1, K_2, \ldots, K_n,$ and $K_{n+1}$ are different reference subcarrier spacing SCSs of n+1 uplink carriers of the user equipment, K_min is a minimum reference subcarrier spacing SCS of the uplink carriers of the user equipment, the n+1 uplink carriers include the n first uplink carriers and one normal uplink carrier, and the m single slot format indexes are divided according to $K_1/K_{min}, K_2/K_{min}, \ldots, K_n/K_{min},$ and $K_{n+1}/K_{min},$ to indicate slot configurations of the n+1 uplink carriers of the user equipment.

Optionally, the single slot format index includes at least one of the following: The single slot format index is the same as a single slot format index configured for the TDD band in which the first uplink carrier is located; or a predefined first slot format, indicating the time domain resource used for SUL transmission; or a predefined second slot format, indicating the time domain resource used for SUL transmission and the flexible time domain resource.

When the first indication information is carried in the SIB or the RRC dedicated signaling, the first indication information further includes at least one configuration pattern and a reference subcarrier spacing SCS that indicates the first uplink carrier, and each configuration pattern includes a configuration cycle of a time domain resource of the first uplink carrier, and one or more of a quantity of uplink slots and/or symbols in the cycle, a quantity of flexible slots and/or symbols in the cycle, and a quantity of disabled resource slots and/or symbols in the cycle.

Specifically, the sending unit 910 is configured to perform S410, S440, and S450 in the method 400, and the receiving unit 920 is configured to perform S430, S430-1, and S430-2 in the method 400. A specific process in which each unit performs the foregoing corresponding steps is described in detail in the method 400. For brevity, details are not described herein again.

FIG. 10 is a schematic block diagram of a resource determining apparatus 1000 according to an embodiment of this application. The apparatus 1000 may correspond to (for example, may be applied to or may be) the terminal device described in the method 400. In addition, modules or units in the apparatus 1000 are separately configured to perform actions or processing processes performed by the terminal device in the method 400. As shown in FIG. 10, the communication apparatus 1000 may include a receiving unit 1010 and a sending unit 1020.

The receiving unit 1010 is configured to receive first indication information sent by a network device. The first indication information indicates M time domain resources of a first uplink carrier, the first uplink carrier supports supplementary uplink SUL transmission, the M time domain resources are time domain resources that are in N time domain resources included in the first uplink carrier and that are used for SUL transmission, the N time domain resources include an uplink resource and/or a flexible time domain resource, the time domain resource includes a slot and/or a symbol, and M<N.

The sending unit 1020 is configured to send a first uplink signal and/or an uplink channel based on the first indication information by using the M time domain resources of the first uplink carrier.

In a possible implementation, when the N time domain resources include a flexible time domain resource, the first indication information further indicates K flexible time domain resources. The flexible time domain resource is used for SUL transmission or downlink transmission, and K<N. The sending unit 1020 is further configured to send the first uplink signal and/or the uplink channel by using the M time domain resources and the K flexible time domain resources of the first uplink carrier.

Optionally, the first indication information is carried in a system information block SIB; or the first indication information is carried in downlink control information DCI; or the first indication information is carried in radio resource control RRC dedicated signaling.

Optionally, a band in which the first uplink carrier is located further includes another resource for downlink transmission, and the band in which the first uplink carrier is located is a TDD band.

Optionally, a slot and/or a symbol used by the first uplink carrier are/is configured as a subset of uplink slots and/or symbols and flexible slots and/or symbols to which the band in which the first uplink carrier is located belongs; or a slot and/or a symbol used by the first uplink carrier are/is configured as a subset of uplink slots and/or symbols or flexible slots and/or symbols to which the band in which the first uplink carrier is located belongs.

In another possible implementation, when the N time domain resources include K flexible time domain resources, the receiving unit 1010 is further configured to receive second indication information sent by the network device. The second indication information indicates L time domain resources that are in the K flexible time domain resources and that are used for SUL transmission, $0 \leq L \leq K$. and the L time domain resources include L0 uplink resources and L1 flexible time domain resources. The sending unit 1020 is further configured to send the first uplink signal and/or the uplink channel by using the M time domain resources and the L flexible time domain resources of the first uplink carrier.

Optionally, the second indication information is carried in radio resource control RRC dedicated signaling; or the second indication information is carried in downlink control information DCI.

In still another possible implementation, the receiving unit 1010 is further configured to receive third indication information sent by the network device. The third indication information indicates S time domain resources that are in the L1 flexible time domain resources and that are used for uplink transmission, and $0 \leq S \leq L1$. The sending unit 1020 is further configured to send the first uplink signal and/or the uplink channel by using the M time domain resources, the L0 uplink resources, and the S time domain resources of the first uplink carrier.

Optionally, the third indication information is carried in downlink control information DCI, and the DCI indicates one or more first uplink carriers used for SUL transmission.

Optionally, when n first uplink carriers are indicated by downlink control information DCI, the DCI specifically indicates a set of slot format combinations, the set of slot format combinations is used to configure the n first uplink carriers, each slot format combination in the set of slot format combinations includes m single slot format indexes, and m is determined according to the following formula: $K_1/K_{min}+K_2/K_{min}+ \ldots +K_n/K_{min}+K_{n+1}/K_{min}=m$, where $K_1$, $K_2, \ldots, K_n$, and $K_{n+1}$ are different reference subcarrier spacing SCSs of n+1 uplink carriers of the terminal device, $K_{min}$ is a minimum reference subcarrier spacing SCS of the uplink carriers of the terminal device, the n+1 uplink carriers include the n first uplink carriers and one normal uplink carrier, and the m single slot format indexes are divided according to $K_1/K_{min}$, $K_2/K_{min}, \ldots, K_n/K_{min}$, and $K_{n+1}/K_{min}$, to indicate slot configurations of the n+1 uplink carriers of the terminal device.

Optionally, the single slot format index includes at least one of the following: The single slot format index is the same as a single slot format index configured for the TDD band in which the first uplink carrier is located, and a configuration of a downlink symbol in the single slot format is ignored; or a predefined first slot format, indicating the time domain resource used for SUL transmission; or a predefined second slot format, indicating the time domain resource used for SUL transmission and the flexible time domain resource.

In yet another possible implementation, when the first indication information is carried in the SIB or the RRC dedicated signaling, the first indication information further includes at least one configuration pattern and a reference subcarrier spacing SCS that indicates the first uplink carrier, and each configuration pattern includes a configuration cycle of a time domain resource of the first uplink carrier, and one or more of a quantity of uplink slots and/or symbols in the cycle, a quantity of flexible slots and/or symbols in the cycle, and a quantity of disabled resource slots and/or symbols in the cycle.

Specifically, the receiving unit 1010 is configured to perform S410, S440, and S450 in the method 400, and the sending unit 1020 is configured to perform S430, S430-1, and S430-2 in the method 400. A specific process in which each unit performs the foregoing corresponding steps is described in detail in the method 400. For brevity, details are not described herein again.

Figure 11:
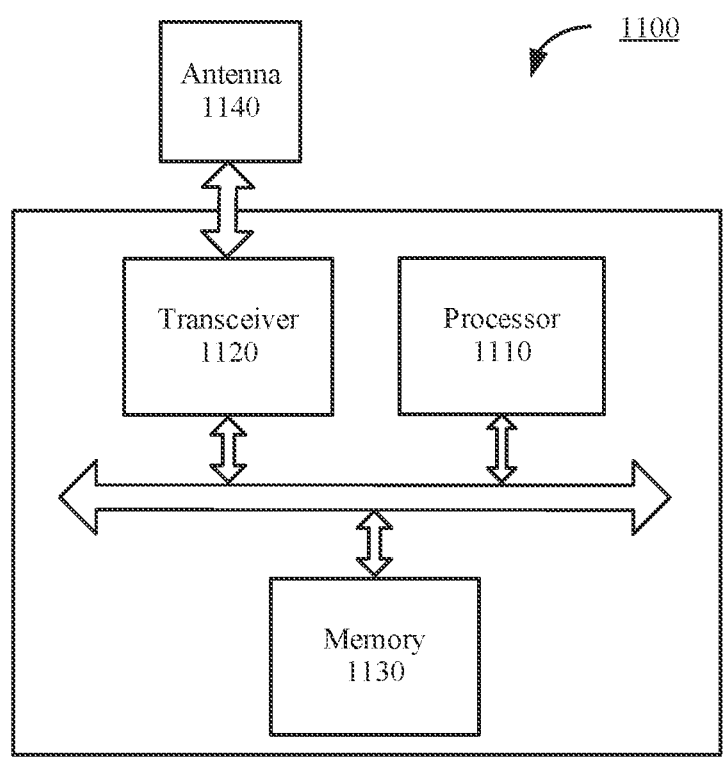
FIG. 11 is a schematic diagram of still another resource determining apparatus according to an embodiment of this application.

FIG. 11 is a schematic diagram of a structure of a network device 1100 according to an embodiment of this application. As shown in FIG. 11, the network device 1100 (for example, a base station) includes a processor 1110 and a transceiver 1120. Optionally, the network device 1100 further includes a memory 1130. The processor 1110, the transceiver 1120, and the memory 1130 communicate with each other through an internal connection channel to transfer a control signal and/or a data signal. The memory 1130 is configured to store a computer program. The processor 1110 is configured to invoke and run the computer program in the memory 1130, to control the transceiver 1120 to receive and send a signal.

The processor 1110 and the memory 1130 may be integrated into one processing apparatus. The processor 1110 is configured to execute program code stored in the memory 1130 to implement the function of the base station in the method embodiments. In specific implementation, the memory 1130 may alternatively be integrated into the processor 1110, or may be independent of the processor 1110. The transceiver 1120 may be implemented by using a transceiver circuit.

The network device may further include an antenna 1140, configured to send, by using a radio signal, downlink data or downlink control signaling that is output by the transceiver 1120, or send, after receiving uplink data or uplink control signaling, the uplink data or the uplink control signaling to the transceiver 820 for further processing.

It should be understood that, the apparatus 1100 may correspond to the base station in the method 400 according to embodiments of this application, and the apparatus 1100 may alternatively be a chip or a component used in the base station. In addition, the modules in the apparatus 1100 implement corresponding procedures in the method 400 in FIG. 4A and FIG. 4B. Specifically, the memory 1130 is configured to store program code, so that when the processor 1110 executes the program code, the transceiver 1120 is configured to perform the processes of S410, S440, and S450 and S410, S430, S430-1, and S430-2 in the method 400. Specific processes of performing the foregoing corresponding steps by the units are described in detail in the method 400. For brevity, details are not described herein again.

Figure 12:
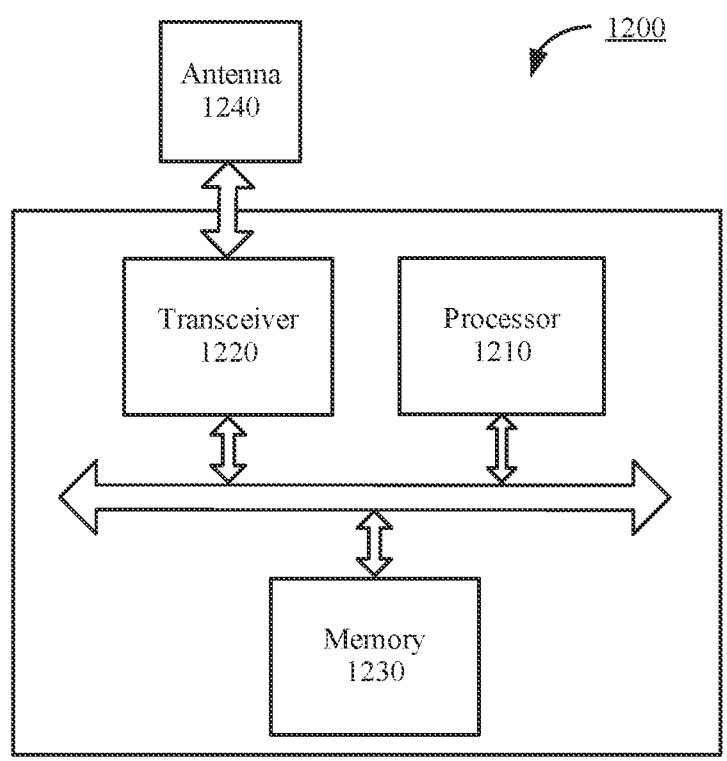
FIG. 12 is a schematic diagram of yet another resource determining apparatus according to an embodiment of this application.

FIG. 12 is a schematic diagram of a structure of a terminal device 1200 according to an embodiment of this application. As shown in FIG. 12, the terminal device 1200 includes a processor 1210 and a transceiver 1220. Optionally, the terminal device 1200 further includes a memory 1230. The processor 1210, the transceiver 1220, and the memory 1230 may communicate with each other through an internal connection path, to transfer a control signal and/or a data signal. The memory 1230 is configured to store a computer program. The processor 1210 is configured to invoke and run the computer program in the memory 1230, to control the transceiver 1220 to receive and send a signal.

The processor 1210 and the memory 1230 may be integrated into one processing apparatus. The processor 1210 is configured to execute program code stored in the memory 1230 to implement the function of the terminal device in the method embodiments. During specific implementation, the memory 1230 may alternatively be integrated into the processor 1210, or may be independent of the processor 1210. The transceiver 1220 may be implemented by using a transceiver circuit.

The terminal device may further include an antenna 1240, configured to send, by using a radio signal, uplink data or uplink control signaling output by the transceiver 1220, or send, after receiving downlink data or downlink control signaling, the downlink data or the downlink control signaling to the transceiver 1220 for further processing.

It should be understood that, the apparatus 1200 may correspond to the terminal device in the method 400 according to embodiments of this application, and the apparatus 1200 may alternatively be a chip or a component used in the terminal device. In addition, the modules in the apparatus 1200 implement corresponding procedures in the method 400 in FIG. 4A and FIG. 4B. Specifically, the memory 1230 is configured to store program code, so that when executing the program code, the processor 1210 controls the processor 1210 to perform S420, S420-1, and S420-2 in the method 400, and the transceiver 1220 is configured to perform the processes of S410, S430, S440, and S450 and S430. S430-1, and S430-2 in the method 400. Specific processes in which each unit performs the foregoing corresponding steps are described in detail in the method 400. For brevity, details are not described herein again.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the described system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiments are only examples. For example, the unit division is only logical function division and may be other division during actual implementation. For example, a plurality of units or components may be combined. In addition, the displayed or discussed mutual couplings or communication connections may be indirect couplings or communication connections through some interfaces, apparatuses, or units.

In addition, function units in the embodiments of this application may be integrated into one physical entity, or each of the units may be separately corresponding to one physical entity, or two or more units may be integrated into one physical entity.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

What is claimed is:

1. A method comprising:
sending, to a terminal device, first indication information in a system information block (SIB), wherein the first indication information indicates M time domain resources of a first uplink carrier and K flexible time domain resources, wherein the first uplink carrier supports supplementary uplink (SUL) transmission, wherein the M time domain resources are in N time domain resources comprised in the first uplink carrier and are for the SUL transmission, wherein the N time domain resources comprise an uplink resource or a flexible time domain resource, wherein each of the N time domain resources comprises a slot or a symbol, wherein K<N, and wherein M<N; and
receiving a first uplink signal or information indicating an uplink channel using the M time domain resources and the K flexible time domain resources.

2. The method of claim 1, wherein the flexible time domain resource is for the SUL transmission or downlink transmission.

3. The method of claim 1, wherein a band in which the first uplink carrier is located comprises a first resource for downlink transmission, and wherein the band is a time-division duplex (TDD) band.

4. The method of claim 1, wherein a slot or a symbol for use by the first uplink carrier is configured as a subset of uplink slots or symbols and/or flexible slots or symbols to which a band in which the first uplink carrier is located belongs.

5. The method of claim 1, further comprising sending, to the terminal device, second indication information indicating L time domain resources that are in the K flexible time domain resources and that are for the SUL transmission, wherein the L time domain resources comprise L0 uplink resources and L1 flexible time domain resources, wherein $0 \leq L \leq K$, and wherein receiving the first uplink signal or the uplink channel comprises receiving the first uplink signal or the uplink channel using the L time domain resources.

6. The method of claim 5, wherein the second indication information is carried in Radio Resource Control (RRC) dedicated signaling.

7. The method of claim 5, wherein the second indication information is carried in downlink control information (DCI).

8. A method comprising:
receiving, from a network device, first indication information in a system information block (SIB), wherein the first indication information indicates M time domain resources of a first uplink carrier and K flexible time domain resources, wherein the first uplink carrier supports supplementary uplink (SUL) transmission, wherein the M time domain resources are in N time domain resources comprised in the first uplink carrier and are for the SUL transmission, wherein the N time domain resources comprise an uplink resource or a flexible time domain resource, wherein each of the N time domain resources comprises a slot or a symbol, wherein K<N, and wherein M<N; and
sending a first uplink signal or information indicating an uplink channel based on the first indication information using the M time domain resources and the K flexible time domain resources.

9. The method of claim 8, wherein the flexible time domain resource is for the SUL transmission or downlink transmission.

10. The method of claim 8, wherein a band in which the first uplink carrier is located comprises a first resource for downlink transmission, and wherein the band is a time-division duplex (TDD) band.

11. The method of claim 8, wherein a slot or a symbol for use by the first uplink carrier is configured as a subset of uplink slots or symbols and/or flexible slots or symbols to which a band in which the first uplink carrier is located belongs.

12. The method of claim 8, further comprising receiving, from the network device, second indication information indicating L time domain resources that are in the K flexible time domain resources and that are for the SUL transmission, wherein $0 \leq L \leq K$, wherein the L time domain resources comprise L0 uplink resources and L1 flexible time domain resources, and wherein sending the first uplink signal or the uplink channel comprises sending the first uplink signal or the uplink channel using the L time domain resources.

13. The method of claim 12, wherein the second indication information is carried in Radio Resource Control (RRC) dedicated signaling.

14. The method of claim 12, wherein the second indication information is carried in downlink control information (DCI).

15. A communication apparatus comprising:
a memory configured to store instructions; and
a processor coupled to the memory and configured to execute the instructions to cause the communication apparatus to:
send, to a terminal device, first indication information in a system information block (SIB), wherein the first indication information indicates M time domain resources of a first uplink carrier and K flexible time domain resources, wherein the first uplink carrier supports supplementary uplink (SUL) transmission, wherein the M time domain resources are in N time domain resources comprised in the first uplink carrier and are for the SUL transmission, wherein the N time domain resources comprise an uplink resource or a flexible time domain resource, wherein each of the N time domain resources comprises a slot or a symbol, wherein K<N, and wherein M<N; and
receive a first uplink signal or information indicating an uplink channel using the M time domain resources and the K flexible time domain resources.

16. The communication apparatus of claim 15, wherein the flexible time domain resource is for the SUL transmission or downlink transmission.

17. The communication apparatus of claim 15, wherein a band in which the first uplink carrier is located comprises a first resource for downlink transmission, and wherein the band is a time division duplex (TDD) band.

18. The communication apparatus of claim 15, wherein a slot and/or a symbol used by the first uplink carrier is configured as a subset of uplink slots or symbols or flexible slots or symbols to which a band in which the first uplink carrier is located belongs.

19. The communication apparatus of claim 15, wherein a slot and/or a symbol used by the first uplink carrier is configured as a subset of uplink slots or symbols and flexible slots or symbols to which a band in which the first uplink carrier is located belongs.

20. The communication apparatus of claim 15, wherein the processor is further configured to execute the instructions to cause the communication apparatus to:
 send, to the terminal device, second indication information indicating L time domain resources that are in the K flexible time domain resources and that are for the SUL transmission, wherein the L time domain resources comprise L0 uplink resources and L1 flexible time domain resources, and wherein $0 \leq L \leq K$; and
 receive the first uplink signal or the uplink channel using the L time domain resources.

* * * * *